United States Patent
Kim et al.

(10) Patent No.: US 9,478,253 B2
(45) Date of Patent: Oct. 25, 2016

(54) METHOD FOR CREATING A CONTENT AND ELECTRONIC DEVICE THEREOF

(71) Applicant: Samsung Electronics Co., Ltd., Suwon-si, Gyeonggi-do (KR)

(72) Inventors: Ji-Eun Kim, Suwon-si (KR); Chang-Gun Um, Hwaseong-si (KR); Seung-Heon Lee, Daegu (KR); Kyung-Ho Chae, Suwon-si (KR); Kyung-Il Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/014,755

(22) Filed: Feb. 3, 2016

(65) Prior Publication Data

US 2016/0155473 A1    Jun. 2, 2016

Related U.S. Application Data

(63) Continuation of application No. 14/622,081, filed on Feb. 13, 2015.

(30) Foreign Application Priority Data

Feb. 19, 2014    (KR) .......................... 10-2014-0019346

(51) Int. Cl.
*H04N 5/765* (2006.01)
*G11B 27/031* (2006.01)
*H04N 9/802* (2006.01)
*G11B 27/36* (2006.01)

(52) U.S. Cl.
CPC ............. *G11B 27/031* (2013.01); *G11B 27/36* (2013.01); *H04N 5/765* (2013.01); *H04N 9/802* (2013.01)

(58) Field of Classification Search
None
See application file for complete search history.

(56) References Cited

U.S. PATENT DOCUMENTS

| 8,515,399 | B2 | 8/2013 | Ivanov et al. |
| 2006/0184538 | A1 | 8/2006 | Randall et al. |
| 2006/0199734 | A1* | 9/2006 | Yamashita ......... H04N 1/00204 503/227 |
| 2010/0036967 | A1 | 2/2010 | Caine et al. |
| 2010/0100882 | A1* | 4/2010 | Ito ......................... G06F 3/0481 718/101 |
| 2010/0118112 | A1* | 5/2010 | Nimri .................... H04N 7/147 348/14.08 |
| 2010/0315479 | A1 | 12/2010 | Wijngaarden et al. |
| 2013/0198642 | A1 | 8/2013 | Carney et al. |
| 2013/0307942 | A1 | 11/2013 | Dini |
| 2014/0181745 | A1* | 6/2014 | Cui .................... H04N 5/23216 715/835 |
| 2014/0375878 | A1 | 12/2014 | Kataoka |

FOREIGN PATENT DOCUMENTS

WO    2013-001135 A1    1/2013

* cited by examiner

*Primary Examiner* — Eileen Adams
(74) *Attorney, Agent, or Firm* — Jefferson IP Law, LLP

(57) ABSTRACT

A method for creating a content in an electronic device is provided. The method includes acquiring first media data acquired by at least one external electronic device, acquiring second media data on a basis of at least a part of the first media data, recognizing a feature of the second media data acquired by the at least one external electronic device, and creating the content on a basis of at least a part of the feature of the second media data.

19 Claims, 15 Drawing Sheets

METHOD FOR CREATING A CONTENT AND ELECTRONIC DEVICE THEREOF

CROSS-REFERENCE TO RELATED APPLICATION(S)

This is a continuation application of prior U.S. patent application Ser. No. 14/622,081, filed on Feb. 13, 2015, which claims the benefit under 35 U.S.C. §119(a) of a Korean patent application filed on Feb. 19, 2014 in the Korean Intellectual Property Office and assigned Serial No. 10-2014-0019346, the entire disclosure of each of which is hereby incorporated by reference.

TECHNICAL FIELD

The present disclosure relates to a technique for creating media data acquired from a plurality of electronic devices as one content.

BACKGROUND

Electronic devices are under development as multimedia devices for providing various services such as voice and video call functions, information input and output functions, and data transmission and reception.

If a video is captured by using a camera equipped in the electronic device, a user can edit the video after completing the video capture.

As described above, the video captured in the electronic device is edited after the capture is complete. Since it takes a long time to edit the video, the user of the electronic device experiences an inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus in which an electronic device creates a content by acquiring media data from a plurality of electronic devices.

Another aspect of the present disclosure is to provide a method and apparatus in which an electronic device creates a content on a basis of a feature of media data acquired from a plurality of electronic devices.

Another aspect of the present disclosure is to provide a method and apparatus in which an electronic device determines whether to re-encode media data on the basis of a feature of the media data acquired from a plurality of electronic devices.

In accordance with an aspect of the present disclosure, a method for creating a content in an electronic device is provided. The method includes acquiring first media data acquired by at least one external electronic device, acquiring second media data on a basis of at least a part of the first media data, recognizing a feature of the second media data acquired by the at least one external electronic device, and creating the content on a basis of at least a part of the feature of the second media data.

In accordance with another aspect of the present disclosure, an electronic device for creating a content is provided. The electronic device includes a memory, a display unit, a communication module, and a content creating module configured to acquire first media data in the electronic device, to acquire second media data on a basis of at least a part of the first media data, to recognize a feature of the second media data, to create the content on a basis of at least a part of the feature of the second media data, and to store the content into the memory.

In accordance with another aspect of the present disclosure, a non-transitory computer-readable storage medium is provided. The non-transitory computer-readable storage medium includes instructions of a program for executing operations of acquiring first media data in an electronic device, acquiring second media data on a basis of at least a part of the first media data, recognizing a feature of the second media data, and creating the content on a basis of at least a part of the feature of the second media data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
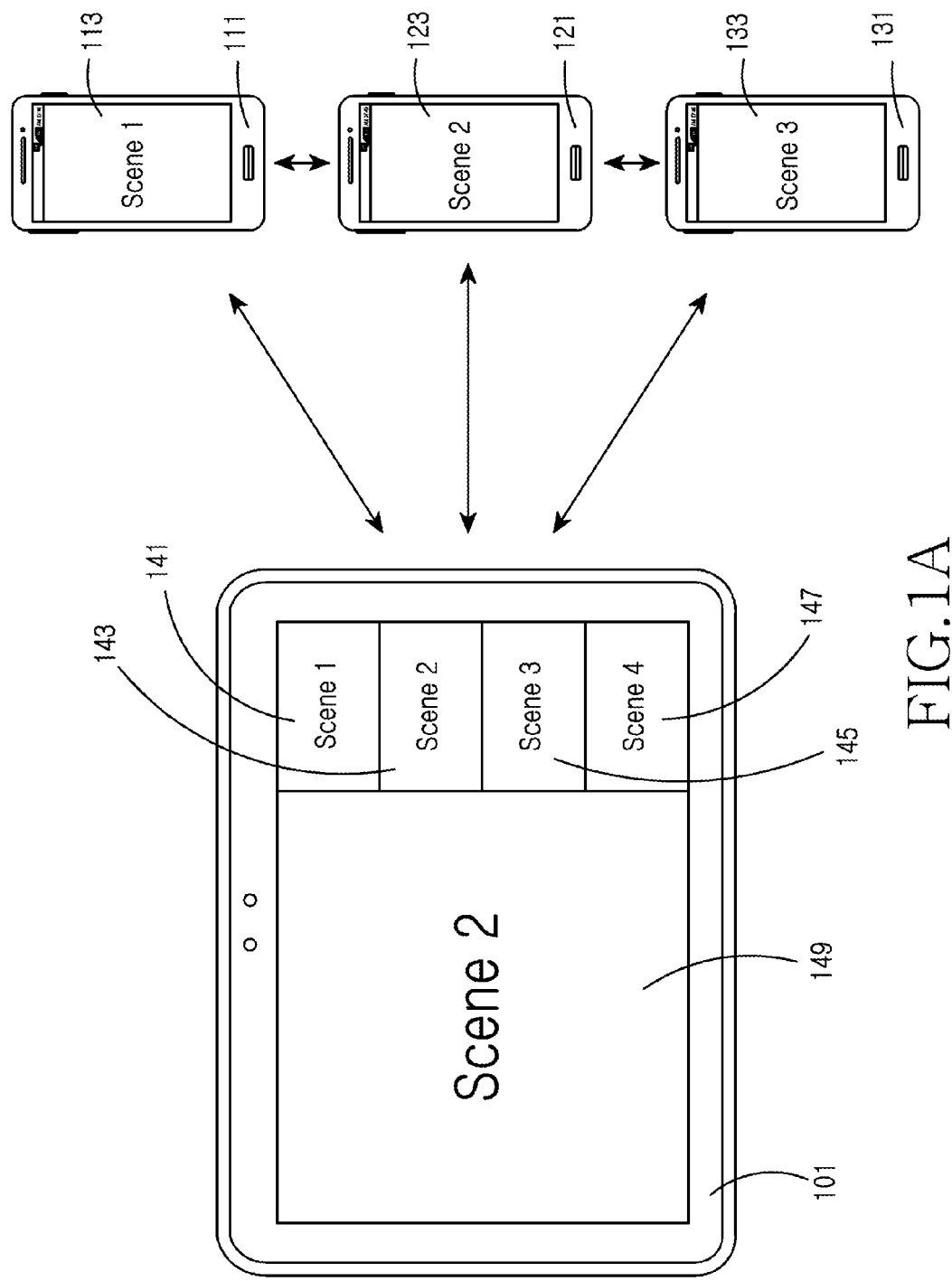
FIGS. 1A, 1B, and 1C illustrate a structure for creating a content on a basis of at least a part of data acquired from an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an (Moving Picture Experts Group) MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, etc. It is apparent to those ordinarily skilled in the art that the electronic device according to various embodiments of the present disclosure is not limited to the aforementioned devices.

FIG. 1A illustrates a structure for creating a content on a basis of at least a part of data acquired from an electronic device according to various embodiments of the present disclosure.

In the various embodiments of the present disclosure, the media data may include at least one of an audio and a video.

In the various embodiments of the present disclosure, the electronic device may be a server for sharing the media data. Further, the electronic device may be a client for sharing the media data. Furthermore, the electronic device may be both the server and client for sharing the media data.

According to an embodiment of the present disclosure, in a case where the electronic device is the server for sharing media data, as shown in FIG. 1, an electronic device 101 may perform a communication connection with at least one external electronic devices 111, 121, and 131.

The electronic device 101 may display first media data 113, 123, and 133 acquired from the electronic device 101 or the external electronic devices 111, 121, and 131 onto preview screens 141, 143, 145, and 147. On the basis of the preview screens 141, 143, 145, and 147 selected in the electronic device 101, the electronic device 101 or at least one external electronic device may be requested to transmit second media data. In this case, the electronic device 101 may enlarge and display the selected preview screens 141, 143, 145, and 147. In addition, the electronic device 101 may display a boundary of the selected preview screens 141, 143, 145, and 147 differently from other preview screens. In the various embodiments of the present disclosure, the first media data may be preview data. In the various embodiments of the present disclosure, the second media may be data to be stored.

According to an embodiment of the present disclosure, in a case where the electronic device 101 starts to create a content, the electronic device 101 may create the content on the basis of at least a part of the second media data acquired from the electronic device 101 or the external electronic devices 111, 121, and 131. In the content creating process, the electronic device 101 may create the content on the basis of the second media data which is received by requesting the electronic device 101 or the external electronic device to transmit the second media data, that is, the data to be stored, on the basis of a user selection from the first media data, i.e., preview data, received from the electronic device 101 or each of the external electronic devices.

In addition, the second media data may be received from the electronic device or the external electronic device on the basis of the user selection. According to the various embodiments of the present disclosure, the electronic device 101 may store previously received second media data and newly received second media data by linking the data to each other. In this case, the electronic device may compare features of the previously received second media data and the newly received second media data. For example, the electronic device 101 may compare at least one of an extension, a coder-decoder (CODEC), a resolution, a brightness, a bit-rate, whether an audio is included, whether a subtitle is included, an audio volume level, a subtitle font, a video profile, a level, a compression scheme (e.g., context-adaptive variable-length coding (CAVLC), context-adaptive binary arithmetic coding (CABAC)), and the like of the second media data. If the previously received second media data and the newly received second media data have different features, the electronic device 101 may convert (e.g., re-encode) the newly received second media data to have the same feature as the previously received second media data. The electronic device 101 may store the data by linking the newly received second media data and the previously received second media data.

According to an embodiment of the present disclosure, in a case where the electronic device is the client for sharing the media data, as shown in FIG. 1, if the electronic device 101 starts to share the media data with at least any one of the external electronic devices 111, 121, and 131, the electronic device 101 may transmit the first media data to any one of the external electronic devices. If any one of the external electronic devices starts to create a content, the electronic device 101 may transmit the second media data to the any one of the external electronic devices starting to create the content. In this case, the electronic device 101 may transmit the second media data in accordance with a time of requesting the second media data on the basis of an index table stored in a memory. According to an embodiment of the present disclosure, the index table may include at least one of a data type, length, offset, and timestamp for each frame or each stream of media data.

Figure 1B:
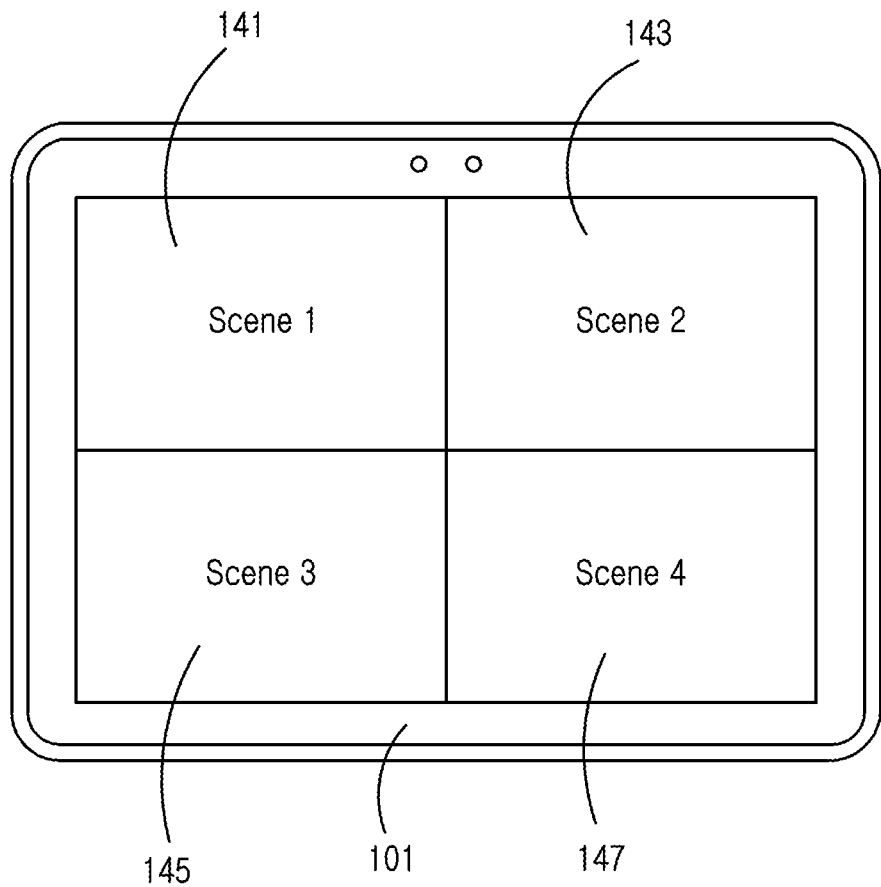

According to an embodiment of the present disclosure, as shown in FIG. 1B, media data received from the external electronic devices or media data of the electronic device 101 may be displayed with the same size in the electronic device 101.

Figure 1C:
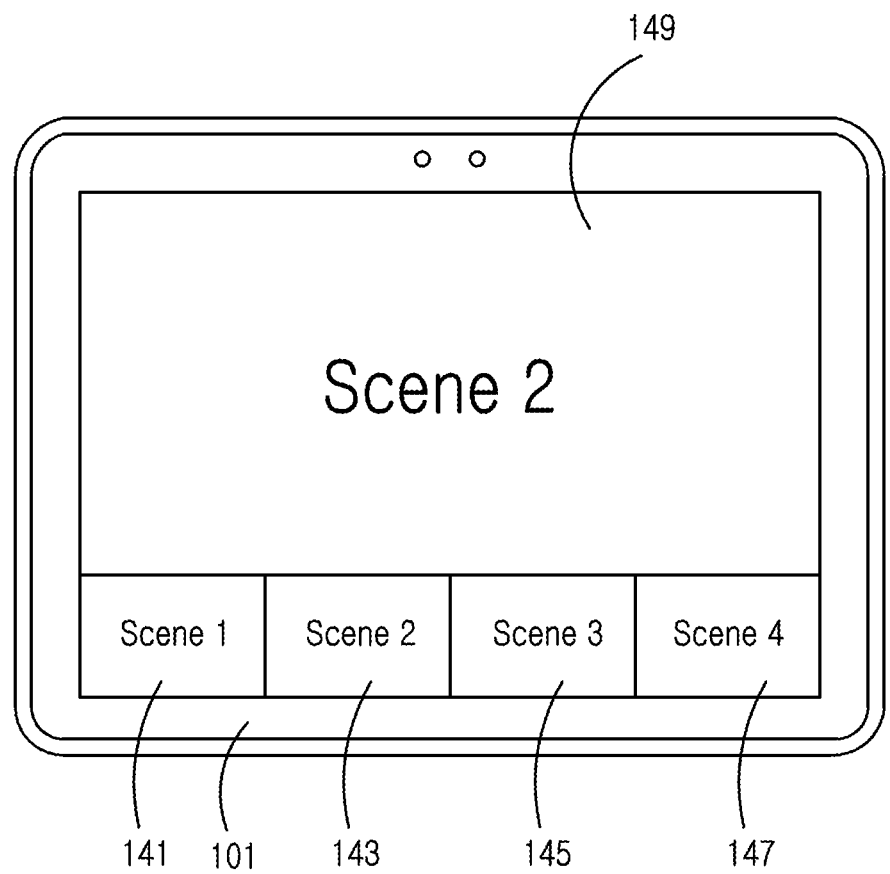

According to an embodiment of the present disclosure, as shown in FIG. 1C, media data received in the electronic device 101 from the external electronic devices or media data of the electronic device 101 may be displayed by changing a location of displaying the media data.

According to an embodiment of the present disclosure, if media data received from the electronic device 101 or external electronic devices shown in FIGS. 1A to 1C is selected, a boundary of a preview screen displayed on the basis of at least a part of the selected media data may be displayed differently from an unselected preview screen. According to an embodiment of the present disclosure, the boundary of the selected preview screen may be displayed in an emphasized manner. According to an embodiment of the present disclosure, the boundary of the selected preview screen may be displayed in a flickering manner.

Figure 2:
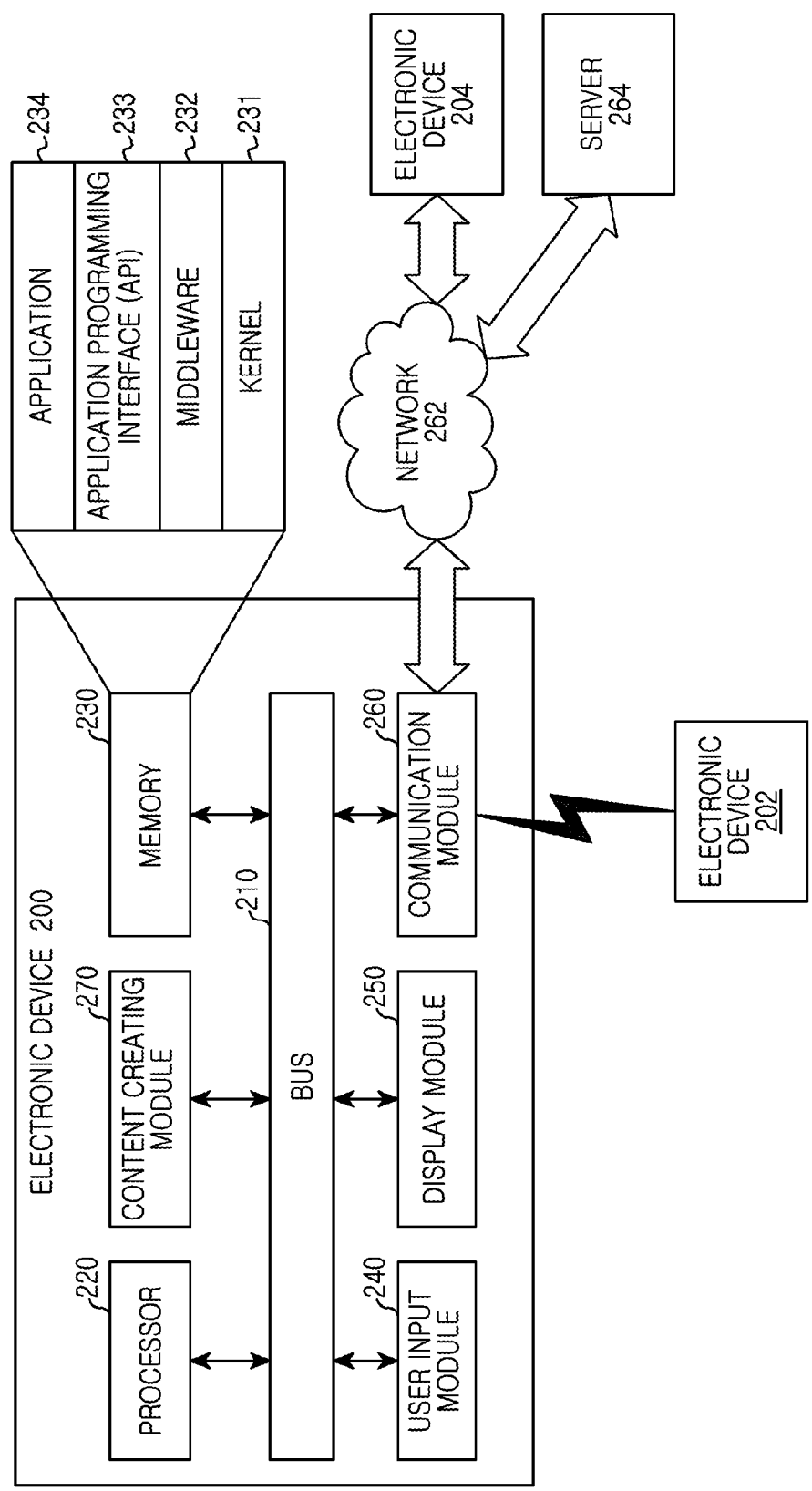
FIG. 2 is a block diagram of an electronic device according to various embodiments of the present disclosure.

FIG. 2 is a block diagram of an electronic device according to various embodiments of the present disclosure.

Referring to FIG. 2, an electronic device 200 may include a bus 210, a processor 220, a memory 230, a user input module 240, a display module 250, a communication module 260, and a content creating module 270.

The bus 210 may be a circuit for connecting the constitutional elements (e.g., the bus 210, the processor 220, the memory 230, the user input module 240, the display module 250, the communication module 260, and the content creating module 270) and for delivering communication (e.g., a control message) between the constitutional elements.

The processor 220 may receive an instruction from other constitutional elements included in the electronic device 200, and may interpret the received instruction and execute an arithmetic operation or data processing according to the interpreted instruction. In this case, the processor 220 may execute at least one application stored in the memory 230 and may provide a service according to the application.

In addition, the processor 220 may include one or more Application Processors (APs) or one or more Communication Processors (CPs). According to an embodiment of the present disclosure, the AP and the CP may be included in the processor 220 or may be included respectively in different Integrated Circuit (IC) packages. In addition, the AP and the CP may be included in one IC package. The AP may control a plurality of hardware or software constitutional elements connected to the AP by driving an operating system or an application program, and may process a variety of data including multimedia data and may perform an arithmetic operation. According to an embodiment of the present disclosure, the AP may be implemented with a System on Chip (SoC). In addition, the CP may perform at least a part of a multimedia control function. In addition, the CP may identify and authenticate a terminal in a communication network by using a subscriber identity module (SIM) (e.g., SIM card). In this case, the CP may provide a service including a voice call, a video call, a text message, or packet data to a user. In addition, the CP may control data transmission/reception of the communication module 260. The AP or the CP may load an instruction or data, which is received from each non-volatile memory connected thereto or at least one of different constitutional elements, to a volatile memory and may process the instruction or data. In addition, the AP or the CP may store data, which is received from at least one of different constitutional elements or generated by at least one of different constitutional elements, in the non-volatile memory. The CP may perform a function of managing a data link and changing a communication protocol in communication between different electronic devices connected through a network to an electronic device including hardware elements. According to an embodiment of the present disclosure, the CP may be implemented with an SoC. In addition, the processor 220 may further include a Graphic Processing Unit (GPU).

The memory 230 may store an instruction or data received from the processor 220 or other constitutional elements (e.g., the user input module 240, the display module 250, the communication module 260, the content creating module 270) or generated by the processor 220 or other constitutional elements. In this case, the memory may include an internal buffer and an external buffer. For example, the memory 230 may store media data acquired by using a camera (not shown) by compressing or not compressing the media data. For another example, the memory 230 may store an index table for the media data acquired by using the camera (not shown). According to an embodiment of the present disclosure, the index table may include at least one of a data type, length, offset, and timestamp for each frame or each stream of the media data.

Further, the memory 230 may include a media data sharing service program (not shown) for creating a content by receiving media data from at least one external electronic device connected to the electronic device, and a media data sharing client program (not shown) for creating a content by transmitting media data to at least one external electronic device connected to the electronic device. In this case, each application may be configured with a programming module, and each programming module may be configured in software, firmware, hardware, or at least two or more of combinations thereof.

A display control program (not shown) may include at least one software constitutional element for controlling the display module 250 to display at least one piece of display data. According to an embodiment of the present disclosure, the display control program (not shown) may display image data received from the external electronic device by using the display module 250.

In addition, the memory 230 may include an internal memory or an external memory. The internal memory may include at least one of a volatile memory (e.g., a Dynamic Random Access Memory (DRAM), a Static RAM (SRAM), a Synchronous DRAM (SDRAM), etc.) or a non-volatile memory (e.g., a One Time Programmable Read-Only Memory (OTPROM), a Programmable ROM (PROM), an Erasable and Programmable ROM (EPROM), an Electrically Erasable PROM (EEPROM), a Mask ROM, a Flash ROM, a Not And (NAND) flash memory, a Not Or (NOR) flash memory, etc.). In this case, the internal memory may have a form of a Solid State Drive (SSD). The external memory may further include Compact Flash (CF), Secure Digital (SD), Micro-SD, Mini-SD, extreme Digital (xD), memory stick, and the like.

The memory 230 may include a programming module such as a kernel 231, a middleware 232, an Application Programming Interface (API) 233, an application 234, and the like. Each of the aforementioned programming modules may consist of software, firmware, or hardware entities or may consist of at least two or more combinations thereof.

The kernel 231 may control or manage system resources (e.g., the bus 210, the processor 220, or memory 230) used to execute an operation or function implemented in the remaining other programming modules (e.g., the middleware 232, the API 233, or the application 234). In addition, the kernel 231 may provide a controllable or manageable interface by accessing individual constitutional elements of the electronic device 200 in the middleware 232, the API 233, or the application 234.

The middleware 232 may perform an intermediary role so that the API 233 or the application 234 communicates with the kernel 231 to exchange data. In addition, according to task requests received from at least one application 234, the middleware 232 may perform load balancing for the task request by using a method of assigning a priority capable of using a system resource (e.g., the bus 210, the processor 220, or memory 230) of the electronic device 200.

The API 233 may include at least one interface or function (e.g., an instruction) for file control, window control, video processing, or character control, etc., according to an embodiment of the present disclosure, as an interface capable of controlling a function provided by the application 234 in the kernel 231 or the middleware 232.

According to various embodiments of the present disclosure, the application 234 may include an Short Message Service (SMS)/Multimedia Messaging Service (MMS) application, an e-mail application, a calendar application, an alarm application, a health care application (e.g., an application for measuring a physical activity level, a blood sugar, etc.) or an environment information application (e.g., atmospheric pressure, humidity, or temperature information). Additionally or alternatively, the application 234 may be an application related to an information exchange between the electronic device 200 and an external electronic device (e.g., an electronic device 202 or 204). The application related to the information exchange may include, for example, a notification relay application for relaying specific information to the external electronic device or a device management application for managing the external electronic device.

According to an embodiment of the present disclosure, the notification relay application may include a function of relaying notification information generated in another application (e.g., an SMS/MMS application, an e-mail application, a health care application, an environment information application, etc.) of the electronic device 200 to the external electronic device (e.g., the electronic device 202 or 204). Additionally or alternatively, the notification relay application may receive notification information, according to an embodiment of the present disclosure, from the external electronic device (e.g., the electronic device 202 or 204) and may provide it to the user. The device management application may manage (e.g., install, delete, or update), according to an embodiment of the present disclosure, a function (e.g., turning on/turning off the external electronic device itself (or some components thereof) or adjusting of a display illumination (or a resolution)) for at least one part of the external electronic device (e.g., the electronic device 202 or 204) which communicates with the electronic device 200, an application which operates in the external electronic device, or a service (e.g., a call service or a message service) provided by the external electronic device.

According to various embodiments of the present disclosure, the application 234 may include an application specified according to attribute information (e.g., an electronic device type) of the external electronic device (e.g., the electronic device 202 or 204). According to an embodiment of the present disclosure, if the external electronic device is an MP3 player, the application 234 may include an application related to a music play. Similarly, if the external electronic device is a mobile medical device, the application 234 may include an application related to a health care. According to an embodiment of the present disclosure, the application 234 may include at least one of an application designated to the electronic device 200 or an application received from the external electronic device (e.g., a server 264 or the electronic device 202 or 204).

The user input module 240 may receive an instruction or data from a user and deliver it to the processor 220 or the memory 230 via the bus 210. For example, the user input module 240 may include a touch panel, a pen sensor, a key, or an ultrasonic input unit. For example, the touch panel may recognize a touch input by using at least one of an electrostatic type, a pressure-sensitive type, and an ultrasonic type. According to an embodiment of the present disclosure, the touch panel may further include a controller. In case of the electrostatic type, not only direct touch but also proximity recognition is also possible. The touch panel may further include a tactile layer. In this case, the touch panel may provide the user with a tactile reaction. For example, the pen sensor may be implemented by using the same or similar method of receiving a touch input of the user or by using an additional sheet for recognition. For example, the key may include a keypad or a touch key. For example, the ultrasonic input unit is a device by which the electronic device detects a sound wave through a microphone by using a pen which generates an ultrasonic signal, and is a device capable of radio recognition.

The display module 250 may display image, video, or data to the user. For example, the display module 250 may include a panel or a hologram. For example, the panel may be a Liquid-Crystal Display (LCD) or an Active-Matrix Organic Light-Emitting Diode (AM-OLED). In addition, the panel may be implemented in a flexible, transparent, or wearable manner. According to an embodiment of the present disclosure, the panel may be constructed as one module with the touch panel. For example, the hologram may use an interference of light and show a stereoscopic image in the air. In addition, the display module 250 may further include a control circuit for controlling the panel or the hologram.

In addition, the display module 250 may display a content under the control of a display control application (not shown). According to an embodiment of the present disclosure, the display module 250 may display image data received from an external electronic device under the control of the display control program (not shown).

The communication module 260 may connect communication between the different electronic device 202 or 204 and the electronic device 200 via a network 262. In this case, the communication module 260 may support a specific near distance communication protocol (e.g., Wireless Fidelity (Wi-Fi), Bluetooth (BT), Near Field Communication (NFC), or specific network communication (e.g., Internet, Local Area Network (LAN), Wide Area Network (WAN), telecommunication network, cellular network, satellite network, Plain Old Telephone Service (POTS), etc.).

A camera (not shown) may acquire a subject by using an image sensor. As an Image Signal Processor (ISP), a media data processor (not shown) may convert output data (e.g., raw data) from the camera (not shown) into image frame (a Red, Green, and Blue (RGB)/YUV) data having a format of a predetermined protocol and may provide it to the processor 220 or the content creating module 270. According to an embodiment of the present disclosure, the camera (not shown) may include an infrared camera module and an ultrasonic camera module.

Each of the different electronic devices 202 and 204 may be the same (e.g., the same type) device as the electronic device 200 or may be a different (e.g., a different type) device.

In addition, the electronic device may further include a sensor module. The sensor module may include at least one of a gesture sensor, a gyro sensor, a pressure sensor, a magnetic sensor, an acceleration sensor, a grip sensor, a proximity sensor, a RGB sensor, a bio sensor, a body conductivity sensor, an image sensor, a temperature sensor, a humidity sensor, an illumination sensor, and an Ultra Violet (UV) sensor. In addition, the sensor module may measure a physical quantity or detect an operation state of the electronic device, and thus may convert the measured or detected information into an electric signal. For example, the sensor module may include an E-nose sensor, an Electro-MyoGraphy (EMG) sensor, an ElectroEncephaloGram (EEG) sensor, an ElectroCardioGram (ECG) sensor, a fingerprint sensor, and the like. In addition, the sensor module may further include a control circuit for controlling at least one or more sensors included therein.

Names of hardware constitutional elements according to various embodiments of the present disclosure may vary depending on a type of the electronic device. The hardware according to various embodiments of the present disclosure may include at least one of the aforementioned constitutional elements, and some of the constitutional elements may be omitted, or additional other constitutional elements may be further included. In addition, some of the hardware constitutional elements according to various embodiments of the present disclosure may be combined and constructed as one entity, so as to equally perform functions of corresponding components before combination.

Figure 3:
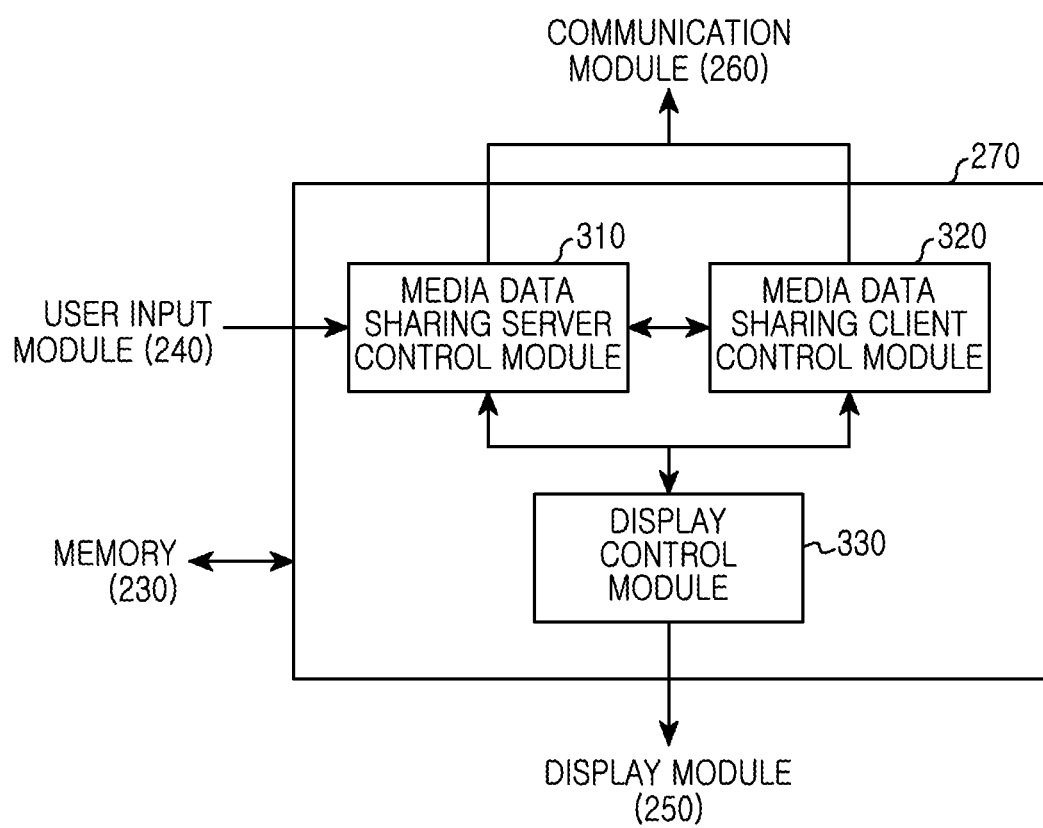
FIG. 3 is a block diagram of a content creating module in detail according to various embodiments of the present disclosure.

FIG. 3 is a block diagram of a content creating module in detail according to various embodiments of the present disclosure.

Referring to FIG. 3, the content creating module 270 may include a media data sharing server control module 310, a media data sharing client control module 320, and a display control module 330. According to an embodiment of the present disclosure, the content creating module 270 may be included in the processor 220 or may be configured as a separate module.

The media data sharing server control module 310 may control to create a content by receiving media data from at least one external electronic device connected to the electronic device. According to an embodiment of the present disclosure, as shown in FIG. 1, if the electronic device 101 is connected for communication with the external electronic devices 111, 121, and 131, the media data sharing server control module 310 may control to display the preview screens 141, 143, and 145 based on at least a part of first media data received from the peer electronic devices 111, 121, and 131. If the preview 143 of the second external electronic device 121 is selected, the media data sharing server control module 310 may control to enlarge and display the preview 143 of the second external electronic device 121 (see 149). According to an embodiment of the present disclosure, the media data sharing server control module 310 may request an external electronic device corresponding a preview selected from the preview screens 141, 143, 145, and 147 to transmit second media data. If content creating starts in a state where the preview 143 of the second external electronic device 121 is selected (see 149), the media data sharing server control module 310 may request the second external electronic device 121 to transmit the second media data captured from a current time. If at least one of the remaining previews other than the preview of the second external electronic device 121 which is currently transmitting the second media data is selected from the plurality of preview screens 141, 143, 145, and 147, after receiving the second media data currently being received from the second external electronic device 121, the media data sharing server control module 310 may receive second media data of the first external electronic device 111 or the third external electronic device 133 or the electronic device 101 and may store the data into the memory 230.

The media data sharing client control module 320 may control to transmit media data to at least one external electronic device connected to the electronic device. According to an embodiment of the present disclosure, as shown in FIG. 1, the media data sharing client control module 320 may transmit first media data to at least one of the first external electronic device 101, second external electronic device 111, and third external electronic device 131 connected for communication. If a content creation start event occurs, the media data sharing client control module 320 may acquire second media data by using a camera and may store the data into a memory. According to one example embodiment, the media data sharing client control module 320 may create an index table and may store detailed information of the second media data acquired by using the camera into the memory. According to an embodiment of the present disclosure, the index table may include at least one of a data type, length, offset, and timestamp for each frame or each stream of media data.

If a video transmission request event occurs in at least one of the first peer electronic device 101, the second peer electronic device 111, and the third peer electronic device 131, the media data sharing client control module 320 may determine a video in accordance with a time at which the video transmission request occurs on the basis of the index table, and may transmit the determined video to a peer electronic device which requests the transmission. According to an embodiment of the present disclosure, the index table may include at least one of a data type, length, offset, and timestamp for each frame or each stream of media data.

The display control module 330 may control the display module 250 to display the display data. For example, the display control module 330 may display the video received from the peer electronic device.

According to an embodiment of the present disclosure, an electronic device for creating a content may include a memory, a display unit, a communication module, and a content creating module configured for acquiring first media data in the electronic device, for acquiring second media data on the basis of at least a part of the first media data, for recognizing a feature of the second media data, and for creating the content on the basis of at least a part of the feature of the second media data and storing the content into the memory.

According to an embodiment of the present disclosure, the content creating module may be configured for creating a preview screen on the basis of the first media data and displaying the preview screen on the display unit.

According to an embodiment of the present disclosure, the content creating module may be configured for receiving the second media data in the electronic device or at least one external electronic device on the basis of at least a part of a request for creating the content.

According to an embodiment of the present disclosure, the content creating module may be configured for requesting the electronic device and/or the at least one external electronic device to transmit the second media data under a selection of a preview screen on the basis of the first media data currently received on the display unit.

According to an embodiment of the present disclosure, the content creating module may be configured for creating the content on the basis of at least a part of the second media data received from the electronic device or at least one external electronic device through the communication module and storing the content into the memory.

According to an embodiment of the present disclosure, the content creating module may be configured for, if the second media data received from the electronic device or the at least one external electronic device has a different feature, creating the content by converting the remaining pieces of media data on the basis of at least a part of a feature of media data acquired in any one of the electronic devices, and storing the content into the memory.

According to an embodiment of the present disclosure, the feature of the media data may contain at least one of as an extension, a CODEC, a resolution, a brightness, a bit-rate, whether an audio is included, whether a subtitle is included, an audio volume level, a subtitle font, a video profile, a level, and a compression scheme of the media data.

According to an embodiment of the present disclosure, the content creating module may be configured for creating the content on the basis of at least one of an audio and video included in the second media data.

Figure 4A:
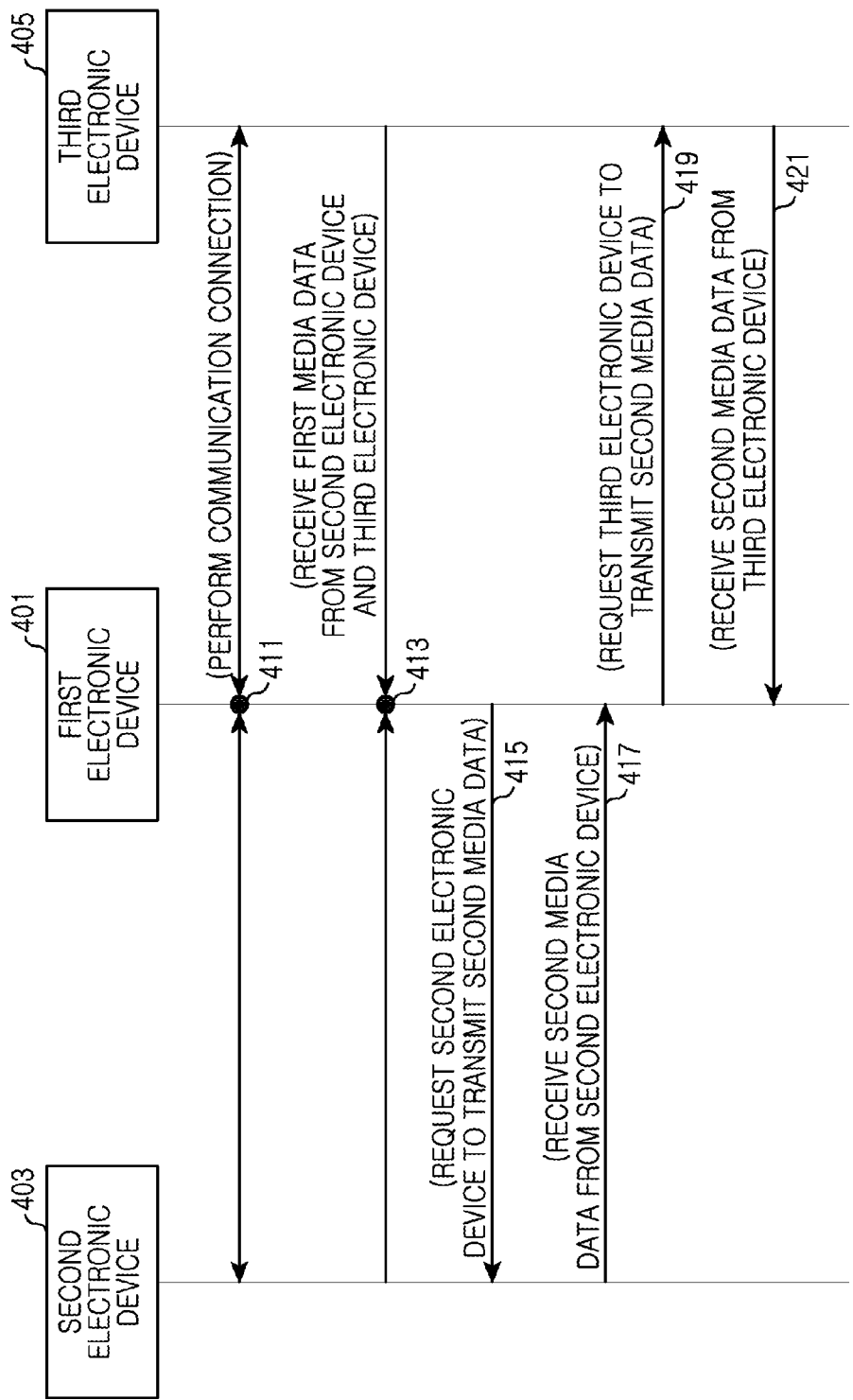
FIGS. 4A and 4B illustrate a procedure for creating a content in an electronic device by receiving media data from external electronic devices connected thereto according to various embodiments of the present disclosure.
Figure 4B:
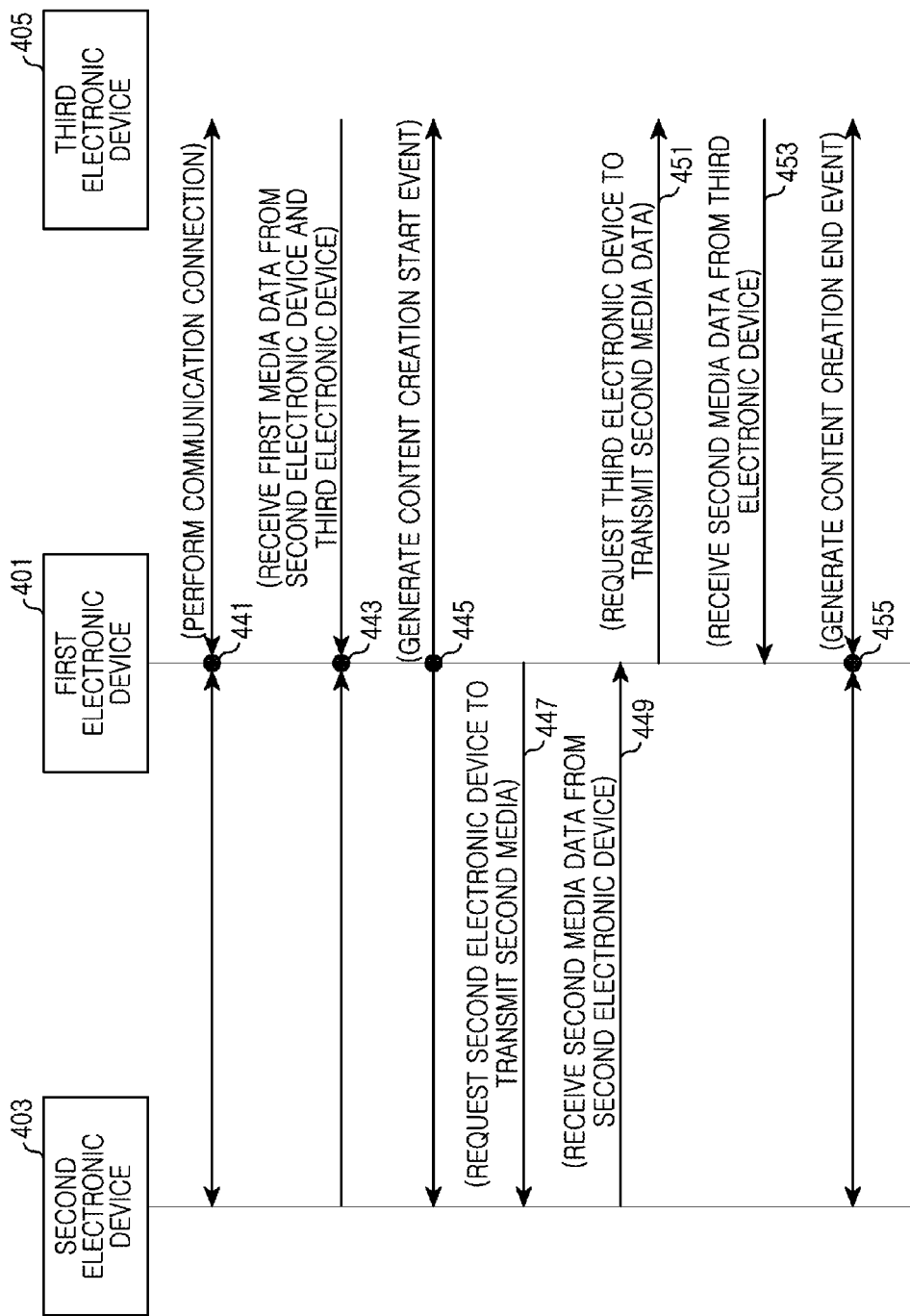

FIGS. 4A and 4B illustrate a procedure for creating a content in an electronic device by receiving media data from external electronic devices connected thereto according to various embodiments of the present disclosure.

Referring to FIG. 4A, a first electronic device 401 may perform operation 411 of connecting communication with a second electronic device 403 and a third electronic device 405. In this case, the first electronic device 401 may be directly connected with each external electronic device (e.g., the second electronic device 403 and the third electronic device 405), or may be connected via a relay such as a base station and an Access Point (AP).

The first electronic device 401 may perform operation 413 of receiving each first media data (e.g., preview data) from the second electronic device 403 and the third electronic device 405. According to an embodiment of the present disclosure, the first electronic device 401 may display a preview screen on a real-time basis on the basis of at least a part of the first media data. According to an embodiment of the present disclosure, the first media data may be transmitted and received between the electronic devices without an additional control procedure after performing the communication connection operation. Alternatively, the first media data may be transmitted and received between the electronic devices on the basis of the additional control procedure after performing the communication connection. According to an embodiment of the present disclosure, the first electronic device 401 may request at least one external electronic device between the second electronic device 403 and the third electronic device 405 to transmit the first media data, and may receive the requested first media data. Alternatively, the first data media may be transmitted and received by using a protocol capable of decreasing a delay which may occur between the electronic devices even if a data loss occurs. According to an embodiment of the present disclosure, the first media data may be transmitted and received by using a User Datagram Protocol (UDP).

The first electronic device 401 may perform operation 415 of requesting the second electronic device 403 to transmit second media data of the second electronic device 403. According to an embodiment of the present disclosure, if a preview screen based on at least a part of first media data received from the second electronic device 403 is selected by a user from preview screens based on at least a part of first media data received from the second electronic device 403 and the third electronic device 405, the first electronic device 401 may request the second electronic device 403 to transmit the second media data of the second electronic device 403. According to an embodiment of the present disclosure, the second media data of the second electronic device 403 may be transmitted and received by using a protocol which supports error correction (or error correcting) to avoid a data loss. According to an embodiment of the present disclosure, the second media data of the second electronic device 403 may be transmitted and received by using a Transmission Control Protocol (TCP).

The first electronic device 401 may perform operation 417 of receiving the second media data from the second electronic device 403. In this case, the first electronic device 401 may store the second media data received from the second electronic device 403 into a memory. Further, the first electronic device 401 may store the second media data received from the second electronic device 403 into a separate server.

The first electronic device 401 may perform operation 419 of requesting the third electronic device 405 to transmit second media data of the third electronic device 405. According to an embodiment of the present disclosure, if a preview screen received from the third electronic device 405 is selected by a user from preview screens based on at least a part of first media data received from the second electronic device 403 and the third electronic device 405, the first electronic device 401 may perform an operation of requesting the third electronic device 405 to transmit the second media data of the third electronic device 405.

The first electronic device 401 may perform operation 421 of receiving the second media data of the third electronic device 405 from the third electronic device 405. In this case, the first electronic device 401 may store the second media data received from the third electronic device 405 into the memory. Further, the first electronic device 401 may store the second media data received from the third electronic device 405 into the separate server.

In case of performing operation 421 of receiving the second media data from the third electronic device 405, the first electronic device 401 may compare a feature of the second media data of the third electronic device 405 received from the third electronic device 405 and a feature of the second media data of the second electronic device 403 received previously from the second electronic device 403.

If the feature of the second media data received from the third electronic device 405 is different from the feature of the second media data received previously from the second electronic device 403, the first electronic device 401 may convert (e.g., re-encode) the second media data received from the third electronic device 405 to have the same feature as the second media data received from the second electronic device 403. The first electronic device 401 may store data by linking the second media data received from the third electronic device 405 to a last part of the second media data received from the second electronic device 403.

Referring to FIG. 4B, a first electronic device 401 may perform operation 441 of connecting communication with a second electronic device 403 and a third electronic device 405. In this case, the first electronic device 401 may be directly connected with each external electronic device, or may be connected via a relay such as a base station and an AP.

The first electronic device 401 may perform operation 443 of receiving each first media data (e.g., preview data) from the second electronic device 403 and the third electronic device 405. According to an embodiment of the present disclosure, the first electronic device 401 may display a preview screen on a real-time basis on the basis of at least a part of the first media data. According to an embodiment of the present disclosure, the first media data may be transmitted and received between the electronic devices without an additional control procedure after performing the communication connection operation. Alternatively, the first media data may be transmitted and received between the electronic devices on the basis of the additional control procedure after performing the communication connection. According to an embodiment of the present disclosure, the first electronic device 401 may perform an operation of requesting at least one external electronic device between the second electronic device 403 and the third electronic device 405 to transmit the first media data, and may perform an operation of receiving the requested first media data. Alternatively, the first data media may be transmitted and received by using a protocol capable of decreasing a delay which may occur between the electronic devices even if a data loss occurs. According to an embodiment of the present disclosure, the first media data may be transmitted and received by using a UDP.

The first electronic device 401 may perform operation 445 of requesting the second electronic device 403 and the third electronic device 405 to start storing the second media data by using a control signal. According to an embodiment of the present disclosure, the first electronic device 401 may request the second electronic device 403 and the third electronic device 405 to start storing the second media data after a reference time elapses from a reference point. According to an embodiment of the present disclosure, the second media data may be transmitted and received by using a protocol which supports error correction (or error correcting) to avoid a data loss. According to an embodiment of the present disclosure, the second media data may be transmitted and received by using a TCP.

The first electronic device 401 may perform operation 447 of requesting the second electronic device 403 to transmit second media data of the second electronic device 403. According to an embodiment of the present disclosure, if a preview screen based on at least a part of first media data received from the second electronic device 403 is selected by a user from preview screens based on at least a part of first media data received from the second electronic device 403 and the third electronic device 405, the first electronic device 401 may request the second electronic device 403 to transmit the second media data of the second electronic device 403.

The first electronic device 401 may perform operation 449 of receiving the second media data of the second electronic device 403 from the second electronic device 403. According to an embodiment of the present disclosure, the first electronic device 401 may store the second media data received from the second electronic device 403 into a memory. According to an embodiment of the present disclosure, the first electronic device 401 may store the second media data received from the second electronic device 403 into a separate server.

The first electronic device 401 may perform operation 451 of requesting the third electronic device 405 to transmit the second media data of the third electronic device 405. For example, if a preview screen based on at least a part of the first media data received from the third electronic device 405 is selected by a user from preview screens based on at least a part of first media data received from the second electronic device 403 and the third electronic device 405, the first electronic device 401 may perform an operation of requesting the third electronic device 405 to transmit the second media data of the third electronic device 405.

The first electronic device 401 may perform operation 453 of receiving the second media data of the third electronic device 405 from the third electronic device 405. According to an embodiment of the present disclosure, the first electronic device 401 may perform an operation of storing the second media data received from the third electronic device 405 into the memory. According to an embodiment of the present disclosure, the first electronic device 401 may perform an operation of storing the second media data received from the third electronic device 405 into the separate server.

In case of performing operation 453 of receiving the second media data from the third electronic device 405, the first electronic device 401 may compare a feature of the second media data of the third electronic device 405 received from the third electronic device 405 and a feature of the second media data of the second electronic device 403 received previously from the second electronic device 403.

If the feature of the second media data received from the third electronic device 405 of the third electronic device 405 is different from the feature of the second media data of the second electronic device 403 received previously from the second electronic device 403, the first electronic device 401 may perform an operation of converting (e.g., re-encoding) the second media data received from the third electronic device 405 to have the same feature as the second media data received from the second electronic device 403. The first electronic device 401 may perform an operation of storing data by linking the second media data of the third electronic device 405 received from the third electronic device 405 to the second media data of the second electronic device 403 received from the second electronic device 403.

The first electronic device 401 may perform operation 455 of requesting the second electronic device 403 and the third electronic device 405 to stop storing the respective second media data by using a control signal. According to an embodiment of the present disclosure, the first electronic device 401 may perform an operation of requesting the second electronic device 403 and the third electronic device 405 to stop storing the second media data after a reference time elapses from a reference point.

In the aforementioned embodiment of the present disclosure, if a feature of second media data of the second electronic device 403 received from the second electronic device 403 is different from a feature of second media data of the third electronic device 405 received from the third electronic device 405, the first electronic device 401 may perform an operation of converting (e.g., re-encoding) the second media data of the third electronic device 405 to have the feature of the previously received second media data of the second electronic device 403.

In an embodiment of the present disclosure, the first electronic device 401 may perform an operation of converting (e.g., re-encoding) the second media data of the second electronic device 403 received from the second electronic device 403 and the second media data of the third electronic device 405 received from the third electronic device 405 based on a feature (e.g., type of media data supported by the electronic device 401) of the first electronic device 401.

In the aforementioned embodiment of the present disclosure, the first electronic device 401 may perform an operation of receiving the first media data (e.g., preview data) from the second electronic device 403 and the third electronic device 405.

In an embodiment of the present disclosure, the first electronic device 401 may perform an operation of displaying the first media data acquired by using the camera of the first electronic device 401 together with a preview screen based on at least a part of the first media data received from the second electronic device 403 and the third electronic device 405.

In addition, the first electronic device 401 may perform an operation of pre-confirming a feature of the second electronic device 403 and the third electronic device 405 at a time of receiving the first media data from the second electronic device 403 and the third electronic device 405.

In addition, the first electronic device 401 may perform an operation of receiving the first media data from the second electronic device 403 and the third electronic device 405 while performing an operation of receiving the second media data from the second electronic device 403 and/or the third electronic device 405.

According to an embodiment of the present disclosure, even if the second electronic device 403 and the third electronic device 405 stop storing of the respective second media data, the first electronic device 401 may perform an operation of receiving the first media data from the second electronic device 403 and the third electronic device 405.

In addition, each of the aforementioned first media data and second media data may have the same feature or a different feature. According to an embodiment of the present disclosure, the first media data and the second media data may be created as different media data on the basis of an encoding scheme of the same media data.

According to an embodiment of the present disclosure, the first electronic device 401, the second electronic device 403, and the third electronic device 405 are classified only to explain that the devices are different from one another, and thus the second electronic device 403 or the third electronic device 405 may be the first electronic device 401 in the aforementioned description.

Figure 5:
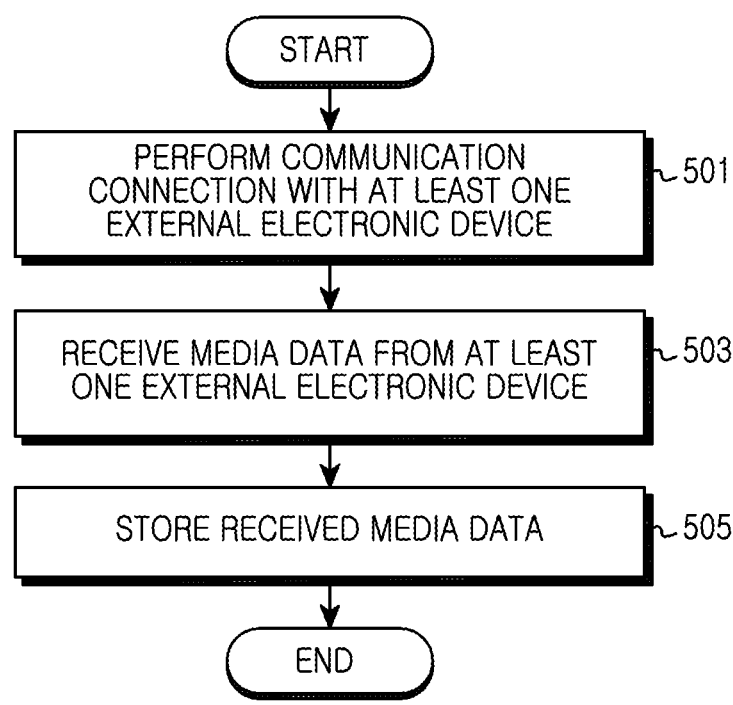
FIG. 5 illustrates a procedure for creating a content in an electronic device by receiving media data from external electronic devices connected thereto according to various embodiments of the present disclosure.

FIG. 5 illustrates a procedure for creating a content in an electronic device by receiving media data from external electronic devices connected thereto according to various embodiments of the present disclosure.

Referring to FIG. 5, in operation 501, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 503, the electronic device may perform an operation of receiving media data from at least one external electronic device. According to an embodiment of the present disclosure, if content creating starts in the electronic device 101 as shown in FIG. 1, the electronic device 101 may perform an operation of requesting at least one external electronic device connected for communication to transmit the media data. According to an embodiment of the present disclosure, if content creating starts in a state where a preview screen of the second external electronic device 121 is selected, the electronic device 101 may perform an operation of requesting the second external electronic device 121 to transmit the media data captured from a current time. According to an embodiment of the present disclosure, the electronic device may perform an operation of receiving the media data requested from the second external electronic device 121.

In operation 505, the electronic device may store the received media data. According to an embodiment of the present disclosure, as shown in FIG. 1, the electronic device 101 may perform an operation of storing the media data received from the second external electronic device 121 after performing an operation of requesting the second external electronic device 121 to transmit the media data captured starting from the current time.

Figure 6:
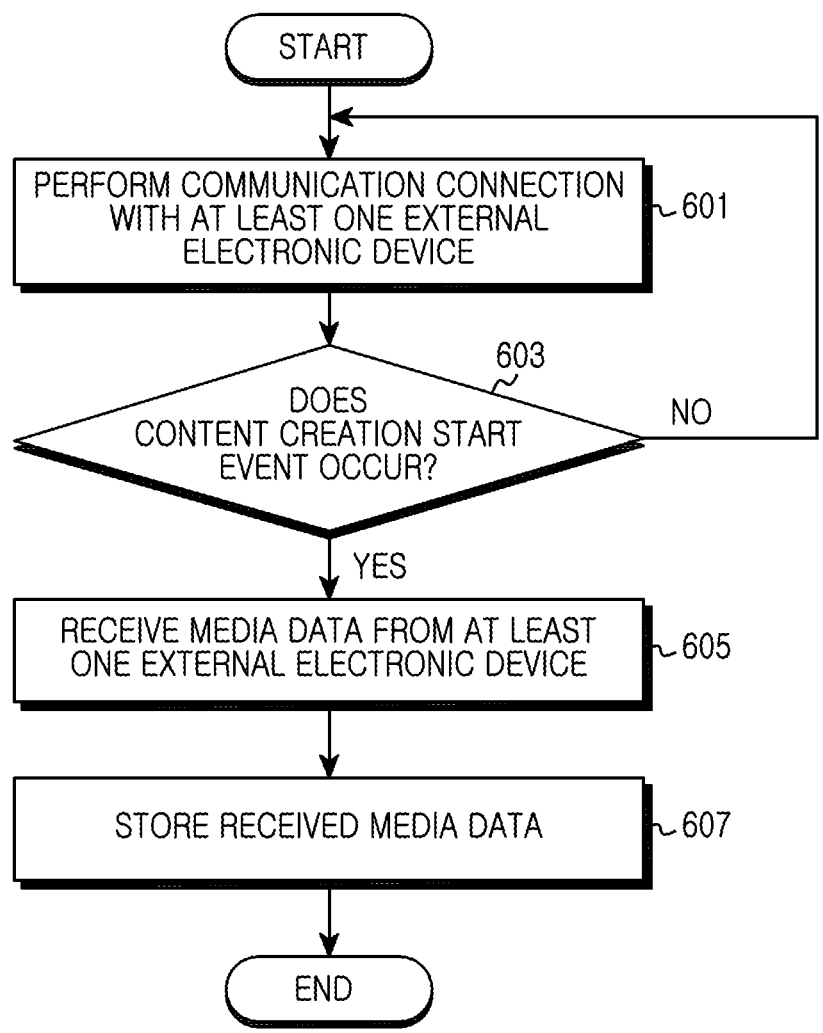
FIG. 6 illustrates a procedure for storing media data in an electronic device by receiving the media data from other electronic devices connected thereto according to various embodiments of the present disclosure.

FIG. 6 illustrates a procedure for storing media data in an electronic device by receiving the media data from other electronic devices connected thereto according to various embodiments of the present disclosure.

Referring to FIG. 6, in operation 601, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 603, the electronic device may perform an operation of determining whether a content creation start event occurs. According to an embodiment of the present disclosure, if content creating starts in the electronic device 101 as shown in FIG. 1, the electronic device 101 may perform an operation of requesting at least one external electronic device connected for communication to transmit the media data. If the content creation start event does not occur, the electronic device may maintain a communication connection state.

If the content creation start event occurs, in operation 605, the electronic device may perform an operation of receiving media data from at least one external electronic device. According to an embodiment of the present disclosure, if content creating starts in a state where a preview screen of the second external electronic device 121 is selected as shown in FIG. 1, the electronic device 101 may request the second external electronic device 121 to transmit the media data captured from a current time. According to an embodiment of the present disclosure, the electronic device may perform an operation of receiving the media data requested from the second external electronic device 121.

In operation 607, the electronic device may perform an operation of storing the received media data. For example, as shown in FIG. 1, the electronic device 101 may perform an operation of storing the media data received from the second external electronic device 121 after requesting the second external electronic device 121 to transmit the media data captured starting from the current time.

Figure 7:
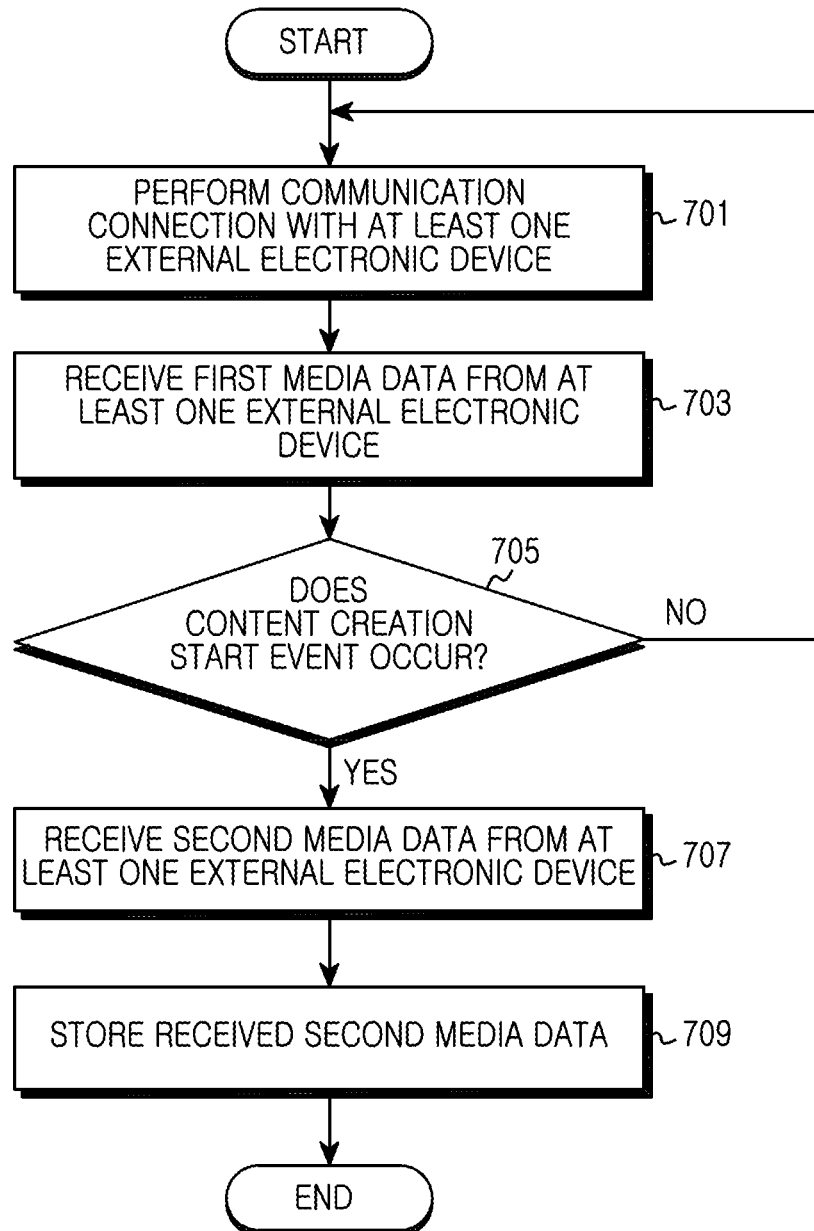
FIG. 7 illustrates a procedure for creating a content in an electronic device by storing media data from external electronic devices connected thereto according to various embodiments of the present disclosure.

FIG. 7 illustrates a procedure for creating a content in an electronic device by storing media data from external electronic devices connected thereto according to various embodiments of the present disclosure.

Referring to FIG. 7, in operation 701, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 703, the electronic device may perform an operation of displaying a preview screen based on at least a part of first media data received from at least one external electronic device. According to an embodiment of the present disclosure, if communication is connected between the electronic device 101 and the external electronic devices 111, 121, and 131 as shown in FIG. 1, the electronic device 101 may perform an operation of displaying the preview screens 141, 143, 145, and 147 based on at least a part of first media data received from the electronic device 101 or the external electronic devices 111, 121, and 131. According to an embodiment of the present disclosure, the electronic device 101 may perform an operation of displaying the preview screen 147 based on at least a part of first media data captured in the electronic device 101 other than the peer electronic devices 111, 121, and 131. According to an embodiment of the present disclosure, the first media data may be transmitted and received between the electronic devices without an additional control procedure after performing the communication connection operation. Alternatively, the first media data may be transmitted and received between the electronic devices on the basis of the additional control procedure after performing the communication connection. According to an embodiment of the present disclosure, the electronic device 101 may perform an operation of requesting at least one of the external electronic devices 111, 121, and 131 to transmit the first media data, and may perform an operation of receiving the requested first media data. According to an embodiment of the present disclosure, the first data media may be transmitted and received by using a protocol capable of decreasing a delay which may occur between the electronic devices even if a data loss occurs. According to an embodiment of the present disclosure, the first media data may be transmitted and received by using a UDP.

In addition, if the preview screen 143 based on at least a part of the first media data of the second external electronic device 121 is selected as shown in FIG. 1, the electronic device 101 may perform an operation of enlarging and displaying the preview screen 143 of the second external electronic device 121 (see 149).

In operation 705, the electronic device may determine whether a content creation start event occurs. According to an embodiment of the present disclosure, if content creating starts in the electronic device 101 as shown in FIG. 1, the electronic device 101 may perform an operation of requesting an external electronic device corresponding to a preview screen selected from preview screens 141, 143, 145, and 147 based on at least a part of first media data to transmit second media data. According to an embodiment of the present disclosure, if the content creation event does not occur, the electronic device may perform an operation of continuously maintaining the display of the preview screen.

According to an embodiment of the present disclosure, if the content creation start event occurs, in operation 707, the electronic device may perform an operation of receiving second media data from at least one external electronic device. For example, as shown in FIG. 1, if content creating starts in a state where the preview screen 143 based on at least a part of the first media data of the second external electronic device 121 is selected (see 149), the electronic device 101 may perform an operation of requesting the second external electronic device 121 to transmit second media data of the second external electronic device 121 captured from a current time. According to an embodiment of the present disclosure, the electronic device may perform an operation of receiving the second media data from the second external electronic device 121. According to an embodiment of the present disclosure, in operation 709, the electronic device may create a content by using the received second media data.

Figure 8:
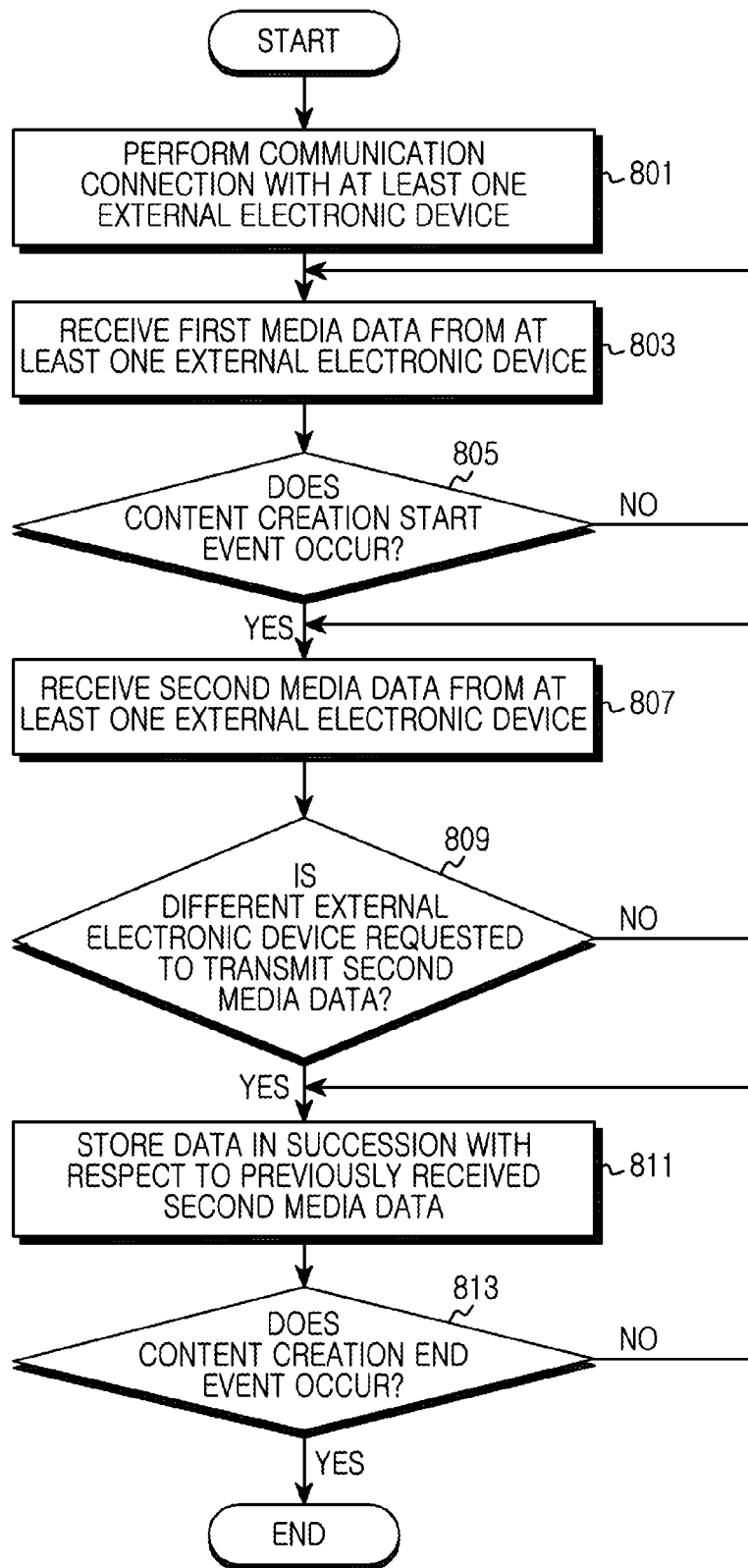
FIG. 8 illustrates a procedure for creating a content in an electronic device by receiving media data from other electronic devices connected thereto according to various embodiments of the present disclosure.

FIG. 8 illustrates a procedure for creating a content in an electronic device by receiving media data from other electronic devices connected thereto according to various embodiments of the present disclosure.

Referring to FIG. 8, in operation 801, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 803, the electronic device may perform an operation of displaying a preview screen based on at least a part of first media data received from at least one external electronic device. According to an embodiment of the present disclosure, if communication is connected between the electronic device 101 and the external electronic devices 111, 121, and 131 as shown in FIG. 1, the electronic device 101 may perform an operation of displaying the preview screens 141, 143, 145, and 147 based on at least a part of first media data received from the external electronic devices 111, 121, and 131. According to an embodiment of the present disclosure, the electronic device 101 may perform an operation of displaying the preview screen 147 based on at least a part of first media data captured in the electronic device 101 other than the external electronic devices 111, 121, and 131. According to an embodiment of the present disclosure, the first media data may be transmitted and received between the electronic devices without an additional control procedure after performing the communication connection operation. Alternatively, the first media data may be transmitted and received between the electronic devices on the basis of the additional control procedure after performing the communication connection. According to an embodiment of the present disclosure, the electronic device 101 may perform an operation of requesting at least one of the external electronic devices 111, 121, and 131 to transmit the first media data, and may perform an operation of receiving the requested first media data. According to an embodiment of the present disclosure, the first data media may be transmitted and received by using a protocol capable of decreasing a delay which may occur between the electronic devices even if a data loss occurs. According to an embodiment of the present disclosure, the first media data may be transmitted and received by using a UDP.

According to an embodiment of the present disclosure, if the preview screen 143 based on at least a part of the first media data of the second external electronic device 121 is selected as shown in FIG. 1, the electronic device 101 may perform an operation of enlarging and displaying the preview screen 143 of the second external electronic device 121 (see 149).

In operation 805, the electronic device may determine whether to perform an operation of requesting at least one external electronic device to transmit second media data. According to an embodiment of the present disclosure, if content creating starts in the electronic device 101 as shown in FIG. 1, the electronic device 101 may perform an operation of requesting an external electronic device corresponding to a preview screen selected from preview screens 141, 143, 145, and 147 based on at least a part of first media data to transmit second media data. According to an embodiment of the present disclosure, if the second media data transmission request does not occur, the electronic device may maintain an operation of displaying a preview screen based on at least a part of first media data.

If the second media data transmission request operation occurs, in operation 807, the electronic device may perform an operation of storing second media data received from a corresponding external electronic device. According to an embodiment of the present disclosure, as shown in FIG. 1, if content creating starts in a state where the preview screen 143 based on at least a part of the first media data of the second external electronic device 121 is selected (see 149), the electronic device 101 may perform an operation of requesting the second external electronic device 121 to transmit second media data captured from a current time. According to an embodiment of the present disclosure, the electronic device may perform an operation of storing the second media data received from the second external electronic device 121.

In operation 809, the electronic device may determine whether an operation of requesting a different external electronic device to transmit second media data occurs. According to an embodiment of the present disclosure, it may be determined whether at least one of the remaining preview screens other than the second external electronic device 121 which is currently transmitting the second media data can be selected from the plurality of preview screens 141, 143, 145, and 147 as shown in FIG. 1. According to an embodiment of the present disclosure, if the operation of requesting the different external electronic device to transmit the second media data does not occur, the electronic device may persistently perform an operation of storing second media data currently received from a corresponding external electronic device in operation 807.

According to an embodiment of the present disclosure, if it is requested to the different external electronic device to transmit the second media data, in operation 811, the electronic device may perform an operation of storing second media data received from the different external electronic device in succession with respect to second media data received previously. According to an embodiment of the present disclosure, if at least one of the remaining preview screens other than the second external electronic device 121 which is currently transmitting the second media data is selected from the plurality of preview screens 141, 143, 145, and 147 as shown in FIG. 1, the electronic device 101 may perform an operation of storing second media data currently received from the second external electronic device 121 in succession with respect to second media data received from the third external electronic device 133 or the electronic device 101. According to an embodiment of the present disclosure, the electronic device 101 may perform an operation of confirming a feature of the second media data received from the second electronic device 121 and the second media data of the third electronic device 131, received from a current time. If the feature of the second media data received from the second electronic device 121 is different from that of the third electronic device 131, the electronic device 101 may perform an operation of storing data in succession by converting (e.g., re-encoding) the currently received second media data of the third electronic device 131 to have the feature of the previously received second media data of the second electronic device 121.

In operation 813, the electronic device may confirm whether a second media data transmission end request occurs. According to an embodiment of the present disclosure, if the second media data transmission end request does not occur, the electronic device may continuously perform operation 811 of storing the second media data.

According to an embodiment of the present disclosure, if the second media data transmission end request occurs, the electronic device may end the procedure of FIG. 8.

In the aforementioned embodiment of the present disclosure, if features of second media data received from external electronic devices are different from each other, the electronic device may perform an operation of converting (e.g., re-encoding) the later received second media data of the external electronic device to have the feature of the received previously second media data of the external electronic device.

In another embodiment of the present disclosure, the electronic device may perform an operation of converting second media data received from external electronic devices to have a feature of second media data supported by the electronic device.

According to an embodiment of the present disclosure, the electronic device may perform an operation of pre-confirming features of external electronic devices at a time of receiving first media data from the external electronic devices.

According to an embodiment of the present disclosure, the electronic device may perform an operation of receiving first media data from at least one external electronic device while receiving second media data from at least one of external electronic devices.

According to an embodiment of the present disclosure, the electronic device may perform an operation of receiving first media data from external electronic devices even if at least one of the external electronic devices stops transmitting the second media data.

According to an embodiment of the present disclosure, as to the aforementioned first media data and second media data, a feature of each media data may be identical or different.

According to an embodiment of the present disclosure, the feature of the media data may include at least one of an extension, a CODEC, a resolution, a brightness, a bit-rate, whether an audio is included, whether a subtitle is included, an audio volume level, a subtitle font, a video profile, a level, a compression scheme (e.g., CAVLC, CABAC), and the like of the media data.

According to an embodiment of the present disclosure, the electronic device and the external electronic devices are classified only to explain that the devices are different from one another, and thus the external electronic devices may be the electronic device in the aforementioned description.

Figure 9:
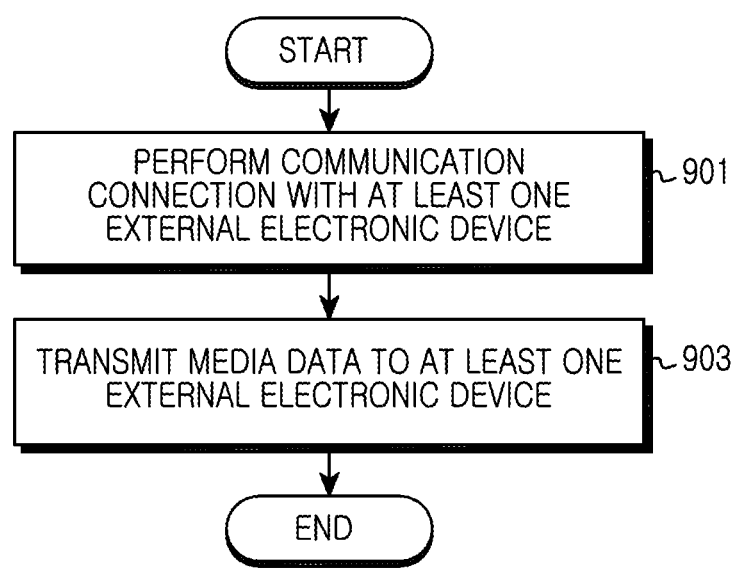
FIG. 9 illustrates a procedure for transmitting media data in an electronic device to other electronic devices connected thereto according to various embodiments of the present disclosure.

FIG. 9 illustrates a procedure for transmitting media data in an electronic device to other electronic devices connected thereto according to various embodiments of the present disclosure.

Referring to FIG. 9, in operation 901, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 903, the electronic device may perform an operation of receiving media data from at least one external electronic device. According to an embodiment of the present disclosure, if the media data transmission request event occurs in at least one of the first external electronic device 111, the second external electronic device 121, and the third external electronic device 131 as shown in FIG. 1, the electronic device 101 may perform an operation of transmitting media data in accordance with a time at which a transmission request occurs to an external electronic device which requests the transmission. According to an embodiment of the present disclosure, the electronic device 101 may perform an operation of storing media data into a memory or a server.

Figure 10:
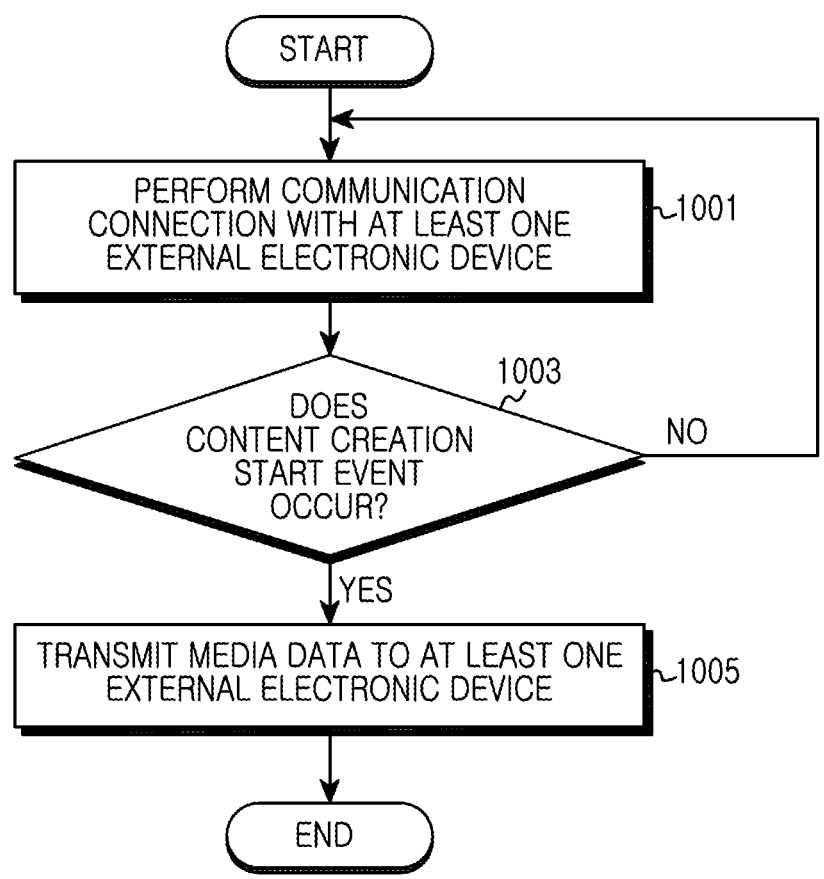
FIG. 10 illustrates a procedure for transmitting media data in an electronic device to other electronic devices connected thereto according to various embodiments of the present disclosure.

FIG. 10 illustrates a procedure for transmitting media data in an electronic device to other electronic devices connected thereto according to various embodiments of the present disclosure.

Referring to FIG. 10, in operation 1001, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 1003, the electronic device may determine whether a media data transmission request occurs. According to an embodiment of the present disclosure, as shown in FIG. 1, the electronic device 101 may determine whether a media data transmission request event occurs in at least one of the first external electronic device 111, the second external electronic device 121, and the third external electronic device 131 connected for communication.

If the media data transmission request event occurs, in an operation 1005, the electronic device may perform an operation of transmitting media data to an external electronic device which requests transmission of media data. According to an embodiment of the present disclosure, if the media data transmission request event occurs in at least one of the first external electronic device 111, the second external electronic device 121, and the third external electronic device 131 as shown in FIG. 1, the electronic device 101 may perform an operation of transmitting media data in accordance with a time at which a transmission request occurs to an external electronic device which requests the transmission. According to an embodiment of the present disclosure, the electronic device may transmit media data stored in a memory or a server.

Figure 11:
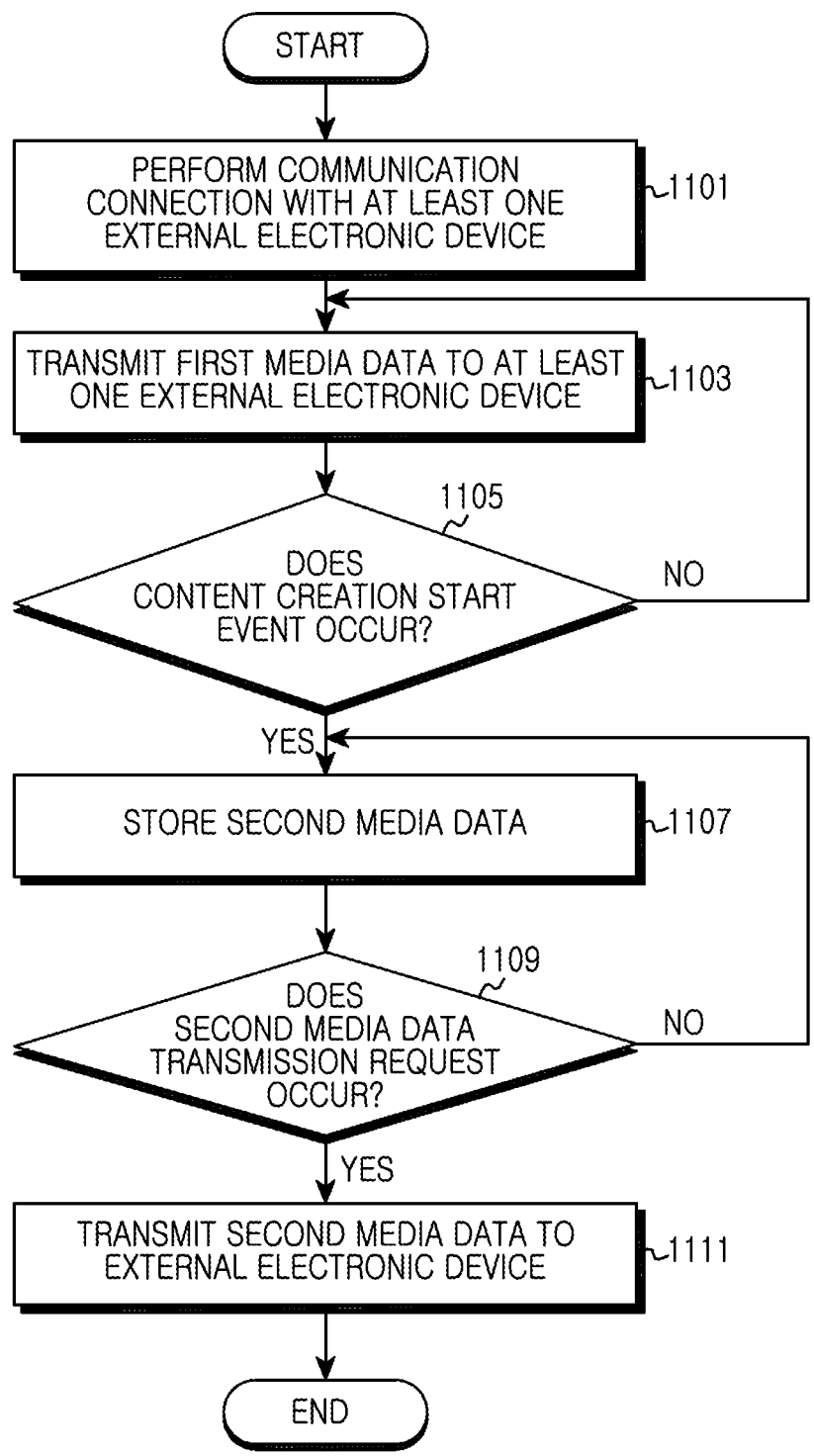
FIG. 11 illustrates a procedure for transmitting media data in an electronic device to other electronic devices connected thereto according to various embodiments of the present disclosure.

FIG. 11 illustrates a procedure for transmitting media data in an electronic device to other electronic devices connected thereto according to various embodiments of the present disclosure.

Referring to FIG. 11, in operation 1101, the electronic device may perform an operation of connecting communication with at least one external electronic device. According to an embodiment of the present disclosure, as shown in FIG. 1, the electronic device 101 may perform an operation of connecting communication with the first external electronic device 111, the second external electronic device 121, and the third external electronic device 131. According to an embodiment of the present disclosure, the electronic device 101 may be directly connected with each external electronic device, or may be connected via a relay such as a base station and an AP.

In operation 1103, the electronic device may perform an operation of transmitting first media data to at least one external electronic device. According to an embodiment of the present disclosure, as shown in FIG. 1, the electronic device 101 may perform an operation of transmitting first media data to at least one of the first external electronic device 111, the second external electronic device 121, and the third external electronic device 131 connected for communication. According to an embodiment of the present disclosure, the first media data may be transmitted and received between the electronic devices without an additional control procedure after performing the communication connection operation. Alternatively, the first media data may be transmitted and received between the electronic devices on the basis of the additional control procedure after performing the communication connection. According to an embodiment of the present disclosure, the electronic device 101 may perform an operation of transmitting requested first media data to a corresponding external electronic device when a first media data transmission request occurs from at least one of the external electronic devices 111, 121, and 131. According to an embodiment of the present disclosure, the first data media may be transmitted and received by using a protocol capable of decreasing a delay which may occur between the electronic devices even if a data loss occurs. According to an embodiment of the present disclosure, the first media data may be transmitted and received by using a UDP.

In operation 1105, the electronic device may determine whether a content creation start event occurs. According to an embodiment of the present disclosure, if the content creation start event does not occur, the electronic device may persistently transmit the first media data in operation 1103.

If the content creation start event occurs, in operation 1107, the electronic device may perform an operation of acquiring second media data and storing it into a memory. According to an embodiment of the present disclosure, the electronic device may create an index table and store detailed information of the second media data into the memory. According to an embodiment of the present disclosure, the index table may include at least one of a data type, length, offset, and timestamp for each frame or each stream of media data.

In operation 1109, the electronic device may determine whether a second media data transmission request occurs. According to an embodiment of the present disclosure, as shown in FIG. 1, the electronic device 101 may determine whether a second media data transmission request event occurs in at least one of the first external electronic device 111, the second external electronic device 121, and the third external electronic device 131 connected for communication. According to an embodiment of the present disclosure, if the second media data transmission request event does not occur, the electronic device may acquire the second media data and persistently store it into the memory in operation 1107.

If the second media data transmission request event occurs, in operation 1111, the electronic device may perform an operation of transmitting second media data to an external electronic device which requests transmission. According to an embodiment of the present disclosure, if the second media data transmission request event occurs in at least one of the first external electronic device 111, the second external electronic device 121, and the third external electronic device 131 as shown in FIG. 1, the electronic device 101 may determine the second media data in accordance with a time at which a transmission request occurs on the basis of an index table and may transmit the determined second media data to an external electronic device which requests the transmission. According to an embodiment of the present disclosure, the second media data may be transmitted and received by using a protocol which supports error correction (or error correcting) to avoid a data loss. According to an embodiment of the present disclosure, the second media data may be transmitted and received by using a TCP.

According to an embodiment of the present disclosure, the electronic device may perform transmission by including a feature of first media data at a time of transmitting the first media data to at least one of external electronic devices.

According to an embodiment of the present disclosure, the electronic device may transmit the first media data to the at least one external electronic device while transmitting second media data to at least one of external electronic devices.

According to an embodiment of the present disclosure, even if at least one external electronic device which is currently receiving second media data stops receiving the second media data, the electronic device may transmit first media data to at least one of external electronic devices.

According to an embodiment of the present disclosure, the electronic device may store only an audio by extracting it from received media data.

According to an embodiment of the present disclosure, the electronic device may create a content by removing an audio from received media data and by converting (e.g., encoding) an additional audio (e.g., an MP3 audio source) stored in a memory together with the received media data.

According to an embodiment of the present disclosure, the electronic device may create a content by requesting an external electronic device to provide only an audio other than a video and by converting (e.g., encoding) it together with a video of different media data (e.g., media data pre-stored in a memory of the electronic device).

According to an embodiment of the present disclosure, a method for creating a content in an electronic device may include acquiring first media data in the electronic device, acquiring second media data on the basis of at least a part of the first media data, recognizing a feature of the second media data, and creating the content on the basis of at least a part of the feature of the second media data.

According to an embodiment of the present disclosure, the acquiring of the first media data may include creating a preview screen on the basis of the first media data.

According to an embodiment of the present disclosure, the acquiring of the second media data may include receiving the second media data in the electronic device or at least one external electronic device on the basis of at least a part of a request for creating the content.

According to an embodiment of the present disclosure, the acquiring of the second media data may include receiving the second media data from the electronic device and/or the at least one external electronic device under a selection of a preview screen on the basis of the first media data.

According to an embodiment of the present disclosure, the creating of the content may include creating the content on the basis of at least a part of the second media data received from the electronic device or at least one external electronic device.

According to an embodiment of the present disclosure, the creating of the content may include, if the second media data received from the electronic device or the at least one external electronic device has a different feature, creating the content by converting the remaining pieces of media data on the basis of at least a part of a feature of media data acquired in any one of the electronic devices.

According to an embodiment of the present disclosure, the feature of the media data may contain at least one of as an extension, a CODEC, a resolution, a brightness, a bit-rate, whether an audio is included, whether a subtitle is included, an audio volume level, a subtitle font, a video profile, a level, and a compression scheme of the media data.

According to an embodiment of the present disclosure, the creating of the content may include creating the content on the basis of at least one of an audio and video included in the second media data.

According to an embodiment of the present disclosure, the first media data and the second media data may be the same except that only a feature of the media data is different.

According to an embodiment of the present disclosure, the first media data or the second media data may be the same media data as that currently displayed on a screen of a display of the electronic device or the external electronic devices.

According to an embodiment of the present disclosure, the first media data or the second media data may be pre-stored media data captured by a camera of the electronic device or the external electronic devices.

According to an embodiment of the present disclosure, the first media data or the second media data may be media data pre-stored in a memory of the electronic device or the external electronic devices.

Figure 12:
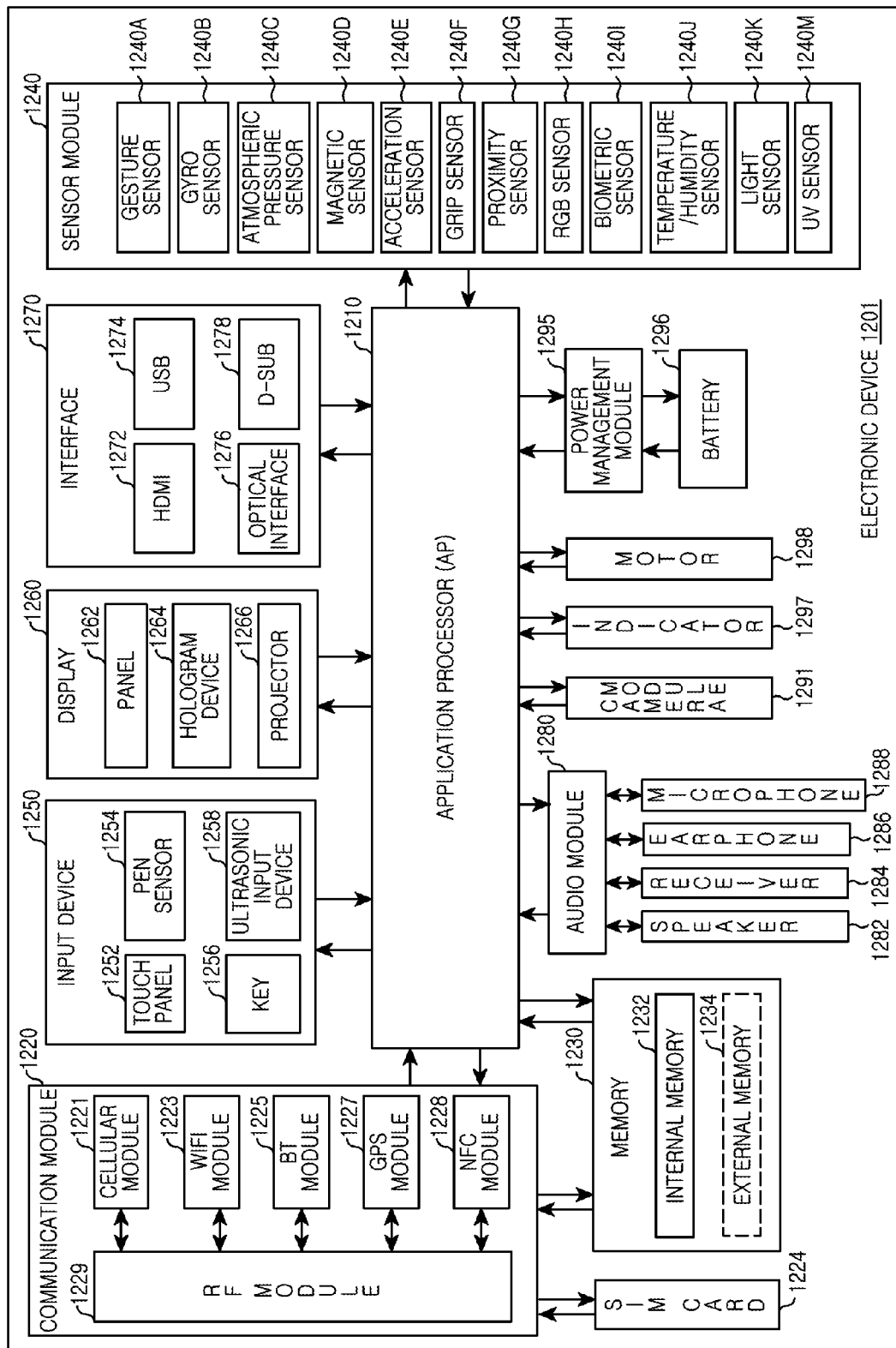
FIG. 12 is a block diagram of an electronic device according to various embodiments of the present disclosure.

FIG. 12 is a block diagram of an electronic device 1201 according to various embodiments of the present disclosure.

According to an embodiment of the present disclosure, the electronic device 1201 may constitute all or some parts of the electronic device 200 of FIG. 2.

Referring to FIG. 12, the electronic device 1201 includes at least one AP 1210, a communication module 1220, a SIM card 1224, a memory 1230, a sensor module 1240, an input unit 1250, a display 1260, an interface 1270, an audio module 1280, a camera module 1291, a power management module 1295, a battery 1296, an indicator 1297, and a motor 1298.

The AP 1210 may control a plurality of hardware or software constitutional elements connected to the AP 1210 by driving an operating system or an application program, and may process a variety of data including multimedia data and may perform an arithmetic operation. The AP 1210 may be implemented, for example, with an SoC. According to an embodiment of the present disclosure, the AP 1210 may further include a GPU.

The communication module 1220 (e.g., the communication module 260) may perform data transmission/reception in communication between other electronic devices (e.g., the electronic device 202 or 204 or the server 264) connected with the electronic device 1201 (e.g., the electronic device 200) through a network. According to an embodiment of the present disclosure, the communication module 1220 may include a cellular module 1221, a Wi-Fi module 1223, a BT module 1225, a GPS module 1227, an NFC module 1228, and a Radio Frequency (RF) module 1229.

The cellular module 1221 may provide a voice call, a video call, a text service, an internet service, and the like through a communication network (e.g., LTE, LTE-A, CDMA, WCDMA, UMTS, WiBro, GSM, etc.). In addition, the cellular module 1221 may identify and authenticate the electronic device within the communication network by using a SIM (e.g., the SIM card 1224). According to an embodiment of the present disclosure, the cellular module 1221 may perform at least some of functions that can be provided by the AP 1210. For example, the cellular module 1221 may perform at least some of multimedia control functions.

According to an embodiment of the present disclosure, the cellular module 1221 may include a Communication Processor (CP). Further, the cellular module 1221 may be implemented, for example, with an SoC. Although constitutional elements such as the cellular module 1221 (e.g., the communication processor), the memory 1230, the power management module 1295, and the like are illustrated as separate constitutional elements with respect to the AP 1210 in FIG. 12, the AP 1210 may also be implemented such that at least one part (e.g., the cellular module 1221) of the aforementioned constitutional elements is included.

According to an embodiment of the present disclosure, the AP 1210 or the cellular module 1221 (e.g., the communication processor) may load an instruction or data, which is received from each non-volatile memory connected thereto or at least one of different constitutional elements, to a volatile memory and may process the instruction or data. In addition, the AP 1210 or the cellular module 1221 may store data, which is received from at least one of different constitutional elements or generated by at least one of different constitutional elements, into the non-volatile memory.

Each of the Wi-Fi module 1223, the BT module 1225, the GPS module 1227, and the NFC module 1228 may include, for example, a processor for processing data transmitted/received through a corresponding module. Although the cellular module 1221, the Wi-Fi module 1223, the BT module 1225, the GPS module 1227, and the NFC module 1228 are illustrated in FIG. 12 as separate blocks, according to an embodiment of the present disclosure, at least some (e.g., two or more) of the cellular module 1221, the Wi-Fi module 1223, the BT module 1225, the GPS module 1227, and the NFC module 1228 may be included in one IC or IC package. For example, at least some of processors corresponding to the cellular module 1221, the Wi-Fi module 1223, the BT module 1225, the GPS module 1227, and the NFC module 1228 (e.g., a communication processor corresponding to the cellular module 1221 and a Wi-Fi processor corresponding to the Wi-Fi module 1223) may be implemented with an SoC.

The RF module 1229 may serve to transmit/receive data, for example, to transmit/receive an RF signal. Although not shown, the RF module 1229 may include, for example, a transceiver, a Power Amp Module (PAM), a frequency filter, a Low Noise Amplifier (LNA), and the like. In addition, the RF module 1229 may further include a component for transmitting/receiving a radio wave on a free space in wireless communication, for example, a conductor, a conducting wire, and the like. Although it is illustrated in FIG. 12 that the cellular module 1221, the Wi-Fi module 1223, the BT module 1225, the GPS module 1227, and the NFC module 1228 share one RF module 1229, according to an embodiment of the present disclosure, at least one of the cellular module 1221, the Wi-Fi module 1223, the BT module 1225, the GPS module 1227, the NFC module 1228 may transmit/receive an RF signal via a separate RF module.

The SIM card 1224 may be a card in which a SIM is implemented, and may be inserted to a slot formed at a specific location of the electronic device. The SIM card 1224 may include unique identification information (e.g., an Integrated Circuit Card IDentifier (ICCID)) or subscriber information (e.g., an International Mobile Subscriber Identity (IMSI)).

The memory 1230 (e.g., the memory 230) may include an internal memory 1232 or an external memory 1234. The internal memory 1232 may include, for example, at least one of a volatile memory (e.g., a DRAM, an SRAM, an SDRAM, etc.) or a non-volatile memory (e.g., an OTPROM, a PROM, an EPROM, an EEPROM, a Mask ROM, a Flash ROM, a NAND flash memory, a NOR flash memory, etc.).

According to an embodiment of the present disclosure, the internal memory 1232 may be a Solid State Drive (SSD). The external memory 1234 may further include a flash drive, and may further include, for example, CF, SD, Micro-SD, Mini-SD, xD, memory stick, and the like. The external memory 1234 may be operatively coupled to the electronic device 1201 via various interfaces. According to an embodiment of the present disclosure, the electronic device 1201 may further include a storage unit (or a storage medium) such as a hard drive.

The sensor module 1240 may measure a physical quantity or detect an operation state of the electronic device 1201, and thus may convert the measured or detected information into an electric signal. The sensor module 1240 may include, for example, at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., an RGB sensor), a bio sensor 1240I, a temperature/humidity sensor 1240J, a light sensor 1240K, and a UV sensor 1240M. Additionally or alternatively, the sensor module 1240 may include, for example, an E-node sensor, an EMG sensor, an EEG sensor, an ECG sensor, a fingerprint sensor, and the like. The sensor module 1240 may further include a control circuit for controlling at least one or more sensors included therein.

The input device 1250 may include a touch panel 1252, a (digital) pen sensor 1254, a key 1256, or an ultrasonic input unit 1258. The touch panel 1252 may recognize a touch input, for example, by using at least one of an electrostatic type, a pressure-sensitive type, and an ultrasonic type. The touch panel 1252 may further include a control circuit. In case of the electrostatic type, not only a physical contact but also a proximity recognition is possible. The touch panel 1252 may further include a tactile layer. In this case, the touch panel 1252 may provide the user with a tactile reaction.

The (digital) pen sensor 1254 may be implemented, for example, by using the same or similar method of receiving a touch input of the user or by using an additional sheet for recognition. The key 1256 may be, for example, a physical button, an optical key, a keypad, or a touch key. The ultrasonic input unit 1258 is a device by which the electronic device 1201 detects a sound wave through a microphone (e.g., a microphone 1288) by using a pen which generates an ultrasonic signal, and is a device capable of radio recognition. According to an embodiment of the present disclosure, the electronic device 1201 may use the communication module 1220 to receive a user input from an external device (e.g., a computer or a server) connected thereto.

The display 1260 (e.g., the display module 250) may include a panel 1262, a hologram 1264, or a projector 1266. The panel 1262 may be, for example, an LCD, an AM-OLED, and the like. The panel 1262 may be implemented, for example, in a flexible, transparent, or wearable manner. The panel 1262 may be constructed as one module with the touch panel 1252. The hologram 1264 may use an interference of light and show a stereoscopic image in the air. The projector 1266 may display an image by projecting a light beam onto a screen. The screen may be located, for example, inside or outside the electronic device 1201. According to an embodiment of the present disclosure, the display 1260 may further include a control circuit for controlling the panel 1262, the hologram 1264, or the projector 1266.

The interface 1270 may include, for example, a High-Definition Multimedia Interface (HDMI) 1272, a Universal Serial Bus (USB) 1274, an optical communication interface 1276, or a D-subminiature (D-sub) 1278. The interface 1270 may be included, for example, in the communication unit 260 of FIG. 2. Additionally or alternatively, the interface 1270 may include, for example, a Mobile High-definition Link (MHL) interface, an SD/Multi-Media Card (MMC) interface, or an Infrared Data Association (IrDA) standard interface.

The audio module 1280 may bilaterally convert a sound and electronic signal. The audio module 1280 may convert sound information which is input or output, for example, through a speaker 1282, a receiver 1284, an earphone 1286, the microphone 1288, and the like.

The camera module 1291 is a device for image and video capturing, and according to an embodiment of the present disclosure, may include one or more image sensors (e.g., a front sensor or a rear sensor), a lens (not shown), an ISP (not shown), or a flash (not shown, e.g., LED or xenon lamp). According to an embodiment of the present disclosure, the camera module 1291 may include an infrared camera module and an ultrasonic camera module.

The power management module 1295 may manage a power of the electronic device 1201. Although not shown, the power management module 1295 may include, for example, a Power Management IC (PMIC), a charger IC, or a battery fuel gauge.

The PMIC may be placed, for example, inside an IC or SoC semiconductor. Charging may be classified into wired charging and wireless charging. The charger IC may charge a battery, and may avoid an over-voltage or over-current flow from a charger. According to an embodiment of the present disclosure, the charger IC may further include a charger IC for at least one of the wired charging and the wireless charging. The wireless charging may be classified into, for example, a magnetic resonance type, a magnetic induction type, and an electromagnetic type. An additional circuit for the wireless charging, for example, a coil loop, a resonant circuit, a rectifier, and the like may be added.

The battery gauge may measure, for example, a residual quantity of the battery 1296 and a voltage, current, and temperature during charging. The battery 1296 may store or generate an electricity, and may supply a power to the electronic device 1201 by using the stored or generated electricity. For example, the battery 1296 may include a rechargeable battery or a solar battery.

The indicator 1297 may indicate a specific state, for example, a booting state, a message state, a charging state, and the like of the electronic device 1201 or a part thereof (e.g., the AP 1210). The motor 1298 may convert an electric signal into a mechanical vibration. Although not shown, the electronic device 1201 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), media flow, and the like.

Each of the aforementioned constitutional elements of the electronic device according to various embodiments of the present disclosure may consist of one or more components, and names thereof may vary depending on a type of the electronic device. The electronic device according to various embodiments of the present disclosure may include at least one of the aforementioned constitutional elements. Some of the constitutional elements may be omitted, or additional other constitutional elements may be further included. In addition, some of the constitutional elements of the electronic device according to various embodiments of the present disclosure may be combined and constructed as one entity, so as to equally perform functions of corresponding constitutional elements before combination.

According to various embodiments of the present disclosure, in a storage medium having instructions stored therein, when the instructions are executed by at least one processor, the processor is configured to perform at least one operation. The at least one operation may include acquiring first media data in the electronic device, acquiring second media data on the basis of at least a part of the first media data, recognizing a feature of the second media data, and creating the content on the basis of at least a part of the feature of the second media data.

As described above, regarding media data acquired from a plurality of electronic devices, a part thereof to be used in an electronic device can be received at each time point, and is linked to the received media data to create a content. Therefore, a user of the electronic device can decrease a time to create the content.

Methods based on various embodiments disclosed in the claims and/or specification based on various embodiments of the present disclosure can be implemented in hardware, software, or a combination of both.

When implemented in software, a non-transitory computer readable recording medium for storing one or more programs (i.e., software modules) can be provided. The one or more programs stored in the non-transitory computer readable recording medium are configured to be executed by one or more processors in an electronic device. The one or more programs include instructions for allowing the electronic device to execute the methods based on various embodiments disclosed in the claims and/or specification of the present disclosure.

The program (i.e., the software module or software) can be stored in a random access memory, a non-volatile memory including a flash memory, a ROM, an EEPROM, a magnetic disc storage device, a Compact Disc-ROM (CD-ROM), DVDs or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a LAN, a Wide LAN (WLAN), or a Storage Area Network (SAN) or a communication network configured by combining the networks. The storage device can access the electronic device via an external port.

In addition, an additional storage unit on a communication network can access a portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a transceiver;
   at least one processor; and
   a memory configured to store instructions that, when executed by the at least one processor, cause the at least one processor to control to:
   establish a communication group including the electronic device and at least one external electronic device,
   display objects in a first size representing each of the electronic device and the at least one external electronic device included in the communication group in a portion of the display,
   display a first image, in a second size that is larger than the first size while displaying the objects in the first size, being obtained by the electronic device or one of the at least one external electronic device included in the communication group that corresponds to a selected first displayed object,
   store the first image in the electronic device,
   while displaying the first image in the second size, storing the first image, and displaying the objects in the first size, detecting an input for selecting a displayed second object, and
   in response to detecting the input for selecting the second displayed object, display a second image, in the second size while displaying the objects in the first size, being obtained by the electronic device or one of the at least one external electronic device included in the communication group that corresponds to the second displayed object,
   wherein each non-selected displayed object includes an image being obtained by a corresponding one of the electronic device and the at least one external electronic device included in the communication group.

2. The electronic device of claim 1, wherein the instructions cause the at least one processor to control to generate a third image by combining the first image with the second image.

3. The electronic device of claim 2, wherein the instructions cause the at least one processor to control to store the generated third image in the electronic device.

4. The electronic device of claim 1, wherein the instructions cause the at least one processor to control to store the second image in the electronic device.

5. The electronic device of claim 1, wherein the instructions cause the at least one processor to control to display differently an object selected from among the displayed objects and objects non-selected from among the displayed objects.

6. The electronic device of claim 1, wherein the instruction cause the at least one processor to control to establish the communication group including the electronic device and at least one external electronic device using a short distance communication.

7. The electronic device of claim 6, wherein the short distance communication comprises Wi-Fi communication.

8. The electronic device of claim 1, wherein, in response to the establishing of the communication group, the instructions cause the at least one processor to control to obtain images being obtained by at least one external electronic device included in the communication group.

9. The electronic device of claim 1, wherein the instructions cause the at least one processor to control to display the objects in a portion of an image being obtained by the electronic device.

10. The electronic device of claim 1, wherein the instructions cause the at least one processor to control to store the first image in response to an input being detected for selecting the displayed first object.

11. A method in an electronic device, comprising:
   establishing a communication group including the electronic device and at least one external electronic device;
   displaying objects in a first size representing each the electronic device and the at least one external electronic device included in the communication group in a portion of a display of the electronic device, the objects being displayed in a first size;
   displaying a first image, in a second size that is larger than the first size while displaying the objects in the first size, being obtained by the electronic device or one of the at least one external electronic device included in the communication group that corresponds to a selected first displayed object;
   storing the first image in the electronic device;
   while displaying the first image in the second size, storing the first image, and displaying the objects in the first size, detecting an input for selecting a displayed second object; and
   displaying a second image, in the second size while displaying the objects in the first size, being obtained by the electronic device or one of the at least one external electronic device included in the communication group that corresponds to the second displayed object, the second image being displayed in the second size, wherein each non-selected displayed object includes an image being obtained by a corresponding one of the electronic device and the at least one external electronic device included in the communication group.

12. The method of claim 11, further comprising generating a third image by combining the first image with the second image.

13. The method of claim 12, further comprising storing the third image in the electronic device.

14. The method of claim 11, wherein the displaying of the objects representing each of the electronic device and the at least one external electronic device included in the communication group comprises displaying differently an object selected from among the displayed objects and objects non-selected from among the displayed objects.

15. The method of claim 11, further comprising storing the second image in the electronic device.

16. The method of claim 11, wherein the establishing of the communication group including the electronic device and the at least one external electronic device comprises establishing the communication group using a short distance communication.

17. The method of claim 16, wherein the short distance communication comprises Wi-Fi communication.

18. The method of claim 11, further comprising:
in response to the establishing of the communication group, obtaining images being obtained by the at least one external electronic device included in the communication group.

19. The method of claim 11, wherein the displaying of the objects representing each the electronic device and the external electronic device included in the communication group comprises displaying the objects in a portion of an image being obtained by the electronic device.

* * * * *